United States Patent
Li et al.

(10) Patent No.: US 12,052,339 B2
(45) Date of Patent: Jul. 30, 2024

(54) DATA PROCESSING METHOD AND APPARATUS

(71) Applicant: Huawei Technologies Co., Ltd., Guangdong (CN)

(72) Inventors: Chao Li, Chengdu (CN); Xingxin Zhang, Chengdu (CN); Pengxin Bao, Chengdu (CN); Xuehuan Wang, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 8 days.

(21) Appl. No.: 17/955,173

(22) Filed: Sep. 28, 2022

(65) Prior Publication Data

US 2023/0030135 A1    Feb. 2, 2023

Related U.S. Application Data

(63) Continuation of application No. PCT/CN2020/082224, filed on Mar. 30, 2020.

(51) Int. Cl.
*H04L 7/04*    (2006.01)
*H04L 7/00*    (2006.01)

(52) U.S. Cl.
CPC ............ *H04L 7/048* (2013.01); *H04L 7/0037* (2013.01)

(58) Field of Classification Search
None
See application file for complete search history.

(56) References Cited

U.S. PATENT DOCUMENTS

| 6,430,397 B1 | 8/2002 | Willrett |
| 9,407,733 B1 | 8/2016 | Mizrahi |
| 2007/0297457 A1 | 12/2007 | Bonnifait et al. |

FOREIGN PATENT DOCUMENTS

| CN | 102148652 A | 8/2011 |
| CN | 103001717 A | 3/2013 |
| CN | 103001718 A | 3/2013 |
| CN | 103384263 A | 11/2013 |
| CN | 106487467 A | 3/2017 |
| CN | 107395307 A | 11/2017 |
| CN | 108964820 A | 12/2018 |
| CN | 110703586 A | 1/2020 |
| EP | 2159940 A1 | 3/2010 |
| WO | 2011035057 A2 | 3/2011 |
| WO | 2014191557 A1 | 12/2014 |

OTHER PUBLICATIONS

Brahmi, Mohamed et al: "Timestamping and latency analysis for multi-sensor perception systems", 2013 IEEE Sensors, IEEE, Nov. 3, 2013 (Nov. 3, 2013), pp. 1-4, XP032532321, total 4 pages.

(Continued)

*Primary Examiner* — Guerrier Merant
(74) *Attorney, Agent, or Firm* — WOMBLE BOND DICKINSON (US) LLP

(57) ABSTRACT

Embodiments of this application disclose a data processing method, which can be applied to a clock synchronization network system. The system can correct, based on a clock frequency error or a time error, a data timestamp of a data packet collected by the system in a time period in which there is no reference clock, so that a corrected system time of the data packet is consistent with a reference time. This improves accuracy of data record.

20 Claims, 8 Drawing Sheets

(56) References Cited

OTHER PUBLICATIONS

IEEE 1588 V2, IEEE Std 1588-2008 (Revision of IEEE Std 1588-2002), "IEEE Standard for a Precision Clock Synchronization Protocol for Networked Measurement and Control Systems," IEEE Instrumentation and Measurement Society, Technical Committee on Sensor Technology (TC-9), dated Jul. 24, 2008, total 289 pages.
IEEE Std 802.1AS-2011, IEEE Standard for Local and metropolitan area networks, "Timing and Synchronization for Time-Sensitive Applications in Bridged Local Area Networks," Mar. 30, 2011, Total 292 Pages.
P802.1AS-Rev—Timing and Synchronization for Time-Sensitive Applications, Current Draft D8.3 (Oct. 8, 2019), https://1.ieee802.org/tsn/802-1as-rev/, Total 12 Pages.

DATA PROCESSING METHOD AND APPARATUS

CROSS-REFERENCE TO RELATED APPLICATIONS

This application is a continuation of International Application No. PCT/CN2020/082224, filed on Mar. 30, 2020, the disclosure of which is hereby incorporated by reference in its entirety.

TECHNICAL FIELD

This application relates to the field of communications technologies, and in particular, to a data processing method and apparatus.

BACKGROUND

For a clock synchronization network (for example, an intra-vehicle network or a 5G network), a time and a frequency of the network can be calibrated by using an external reference clock signal (for example, a global positioning system signal or a BeiDou satellite system signal). However, because coverage of the external reference clock signal is limited, the clock synchronization network may be in a state in which a reference clock signal is lost. For example, the network system cannot receive the reference clock signal when the network system is located in an area, for example, a tunnel or a basement. When the network system loses the reference clock signal, the network system is in an autonomous state, and all network elements maintain time and frequency synchronization with a system clock. However, considering a frequency error between the system clock and the external reference clock signal, there is a specific error between a data recording time (for example, a recording time of a system work log) in the system and a real time. Data in the system may be used for accident assessment, system debugging, or the like. For example, when system debugging needs to be performed, a time point at which the system is faulty can be determined by viewing the system work log. However, if the system loses the reference clock signal, there is an error between the data recording time in the system and the real time, and consequently, the data in the system cannot accurately reflect a real working status of the system.

SUMMARY

Embodiments of this application provide a data processing method and apparatus, to correct a system time of data collected when a network system loses a reference clock signal, thereby improving accuracy of data record.

According to a first aspect, an embodiment of this application provides a data processing method. The data processing method may be performed by a clock synchronization network system or one or more network elements in the system. The clock synchronization network system may adjust a data timestamp $T_i$ of an $i^{th}$ data packet based on error information. The error information is a clock frequency error or a time error, the clock frequency error is a difference between a system clock frequency and a reference clock frequency, and the time error is a difference between a system time and a reference time. The $i^{th}$ data packet is any data packet collected by the system in a time period in which there is no reference clock, i is a positive integer, and $T_i$ is a system time corresponding to a collection moment of the $i^{th}$ data packet. It can be learned that, the clock synchronization network system may correct, based on the clock frequency error or the time error, a data timestamp of the any data packet collected by the system in the time period in which there is no reference clock, so that a corrected system time of the data packet is consistent with the reference time. This improves accuracy of data record.

In an embodiment, the error information is a clock frequency error $\Delta f$, and the clock frequency error $\Delta f = f_{sys} - f_r$ is a fixed value, where $f_{sys}$ is a system clock frequency corresponding to a moment at which the reference clock is detected again, and $f_r$ is a reference clock frequency.

In an embodiment, an adjusted data timestamp of the $i^{th}$ data packet is $T_i'$; and $T_i'$ satisfies the following condition:

$T_i' = T_i - (\Delta f / f_{sys}) \times T_s \times i$, where $T_s$ is a sampling cycle.

In an embodiment, the error information is a time error T or a time error t, the time error T is a difference between a reference time corresponding to a first moment and a system time corresponding to the first moment, and the time error t satisfies the following condition:

$t = T/K$, where the first moment is a moment at which the reference clock is detected again after the $i^{th}$ data packet is collected, and K is a quantity of data packets collected in the time period in which there is no reference clock.

In an embodiment, an adjusted data timestamp of the $i^{th}$ data packet is $T_i'$; and $T_i'$ satisfies the following condition:

$T_i' = T_i - T/K \times i$, or $T_i' = T_i - t \times i$.

It can be learned that, when the clock frequency error is a fixed value or approximately a fixed value, the foregoing method may evenly allocate time errors accumulated in the time period in which there is no reference clock to all data packets collected in the time period in which there is no reference clock, and correct data timestamps of all the data packets based on the time errors. This effectively improves accuracy of data record.

In an embodiment, the error information is a clock frequency error; and when a $j^{th}$ data packet is collected, the clock frequency error $\Delta f_j$ satisfies the following condition:

$\Delta f_j = T_s \times S \times j$, where $T_s$ is a sampling cycle, S is an increase rate of the clock frequency error, S is a real number, and j satisfies $0 \leq j \leq i$.

In an embodiment, an adjusted data timestamp of the $i^{th}$ data packet is and $T_i'$; and $T_i'$ satisfies the following condition:

$T_i' \in [T_{min}, T_{max}]$, where when $S \geq 0$, $T_{min} = T_i - \sum_{j=0}^{i}((\Delta f_j / f_{sys,j}) \times T_s)$ and $T_{max} = T_i - \sum_{j=0}^{i-1}((\Delta f_j / f_{sys,j}) \times T_s)$;

or when $S \leq 0$, $T_{min} = T_i - \sum_{j=0}^{i-1}((\Delta f_j / f_{sys,j}) \times T_s)$ and $T_{max} = T_i - \sum_{j=0}^{i}((\Delta f_j / f_{sys,j}) \times T_s)$;

and $f_{sys,j}$ is a system clock frequency corresponding to a moment at which the $j^{th}$ data packet is collected.

It can be learned that, when clock frequency errors are approximately linearly accumulated, the foregoing method may determine time errors accumulated in the time period in which there is no reference clock, and correct data timestamps of all the data packets based on the time errors. This can effectively improve accuracy of data record.

In an embodiment, the error information includes a clock frequency error $\Delta f_j$ of the any data packet; and $\Delta f_j$ is determined based on a correspondence between a locally stored clock frequency error of the any data packet collected by the system in the time period in which there is no reference clock and a sampling condition.

In an embodiment, an adjusted data timestamp of the $i^{th}$ data packet is and $T_i'$; and $T_i'$ satisfies the following condition:

$$T_i' = T_i - \sum_{j=0}^{i}\left(\left(\Delta f_j/f_{sys,j}\right) \times T_s\right),$$

where
$T_s$ is a sampling cycle, $f_{sys,j}$ is a system clock frequency corresponding to a moment at which a $j^{th}$ data packet is collected, and j satisfies $0 \leq j \leq i$.

It can be learned that, the clock frequency error may be determined by using historical test information. The system may estimate a data error of each data packet based on the historical test information, and correct a data timestamp of each data packet based on the time error. This can effectively improve accuracy of data record.

According to a second aspect, an embodiment of this application provides a data processing apparatus, including a processor, where the processor is coupled to a memory;
the memory is configured to store program code; and
the processor is configured to execute the code in the memory and perform the following operations:
adjusting a data timestamp $T_i$ of an $i^{th}$ data packet based on error information, where the error information is a clock frequency error or a time error, the clock frequency error is a difference between a system clock frequency and a reference clock frequency, and the time error is a difference between a system time and a reference time. The $i^{th}$ data packet is any data packet collected by a system in a time period in which there is no reference clock, i is a positive integer, and $T_i$ is a system time corresponding to a collection moment of the $i^{th}$ data packet.

In an embodiment, the error information is a clock frequency error $\Delta f$, and the clock frequency error $\Delta f = f_{sys} - f_r$ is a fixed value, where $f_{sys}$ is a system clock frequency corresponding to a moment at which the reference clock is detected again, and $f_r$ is a reference clock frequency.

In an embodiment, an adjusted data timestamp of the $i^{th}$ data packet is $T_i'$; and $T_i'$ satisfies the following condition:

$T_i' = T_i - (\Delta f/f_{sys}) \times T_s \times i$, where $T_s$ is a sampling cycle.

In an embodiment, the error information is a time error T or a time error t, the time error T is a difference between a reference time corresponding to a first moment and a system time corresponding to the first moment, and the time error t satisfies the following condition:

$t = T/K$, where the first moment is a moment at which the reference clock is detected again after the $i^{th}$ data packet is collected, and K is a quantity of data packets collected in the time period in which there is no reference clock.

In an embodiment, an adjusted data timestamp of the $i^{th}$ data packet is $T_i'$; and $T_i'$ satisfies the following condition:

$T_i' = T_i - T/K \times i$, or $T_i' = T_i - t \times i$.

In an embodiment, the error information is a clock frequency error; and when a $j^{th}$ data packet is collected, the clock frequency error $\Delta f_j$ satisfies the following condition:

$\Delta f_j = T_s \times S \times j$, where $T_s$ is a sampling cycle, S is an increase rate of the clock frequency error, S is a real number, and j satisfies $0 \leq j \leq i$.

In an embodiment, an adjusted data timestamp of the $i^{th}$ data packet is $T_i'$; and $T_i'$ satisfies the following condition:

$T_i' \in [T_{min}, T_{max}]$, where when $S \geq 0$, $$T_{min} = T_i - \sum_{j=0}^{i}\left(\left(\Delta f_j/f_{sys,j}\right) \times T_s\right) \text{ and } T_{max} = T_i - \sum_{j=0}^{i-1}\left(\left(\Delta f_j/f_{sys,j}\right) \times T_s\right);$$

or when $S \leq 0$, $$T_{min} = T_i - \sum_{j=0}^{i-1}\left(\left(\Delta f_j/f_{sys,j}\right) \times T_s\right) \text{ and } T_{max} = T_i - \sum_{j=0}^{i}\left(\left(\Delta f_j/f_{sys,j}\right) \times T_s\right);$$

and $f_{sys,j}$ is a system clock frequency corresponding to a moment at which the $j^{th}$ data packet is collected.

In an embodiment, the error information includes a clock frequency error $\Delta f_j$ of the any data packet; and the clock frequency error $\Delta f_j$ is determined based on a correspondence between a locally stored clock frequency error of the any data packet collected by the system in the time period in which there is no reference clock and a sampling condition.

In an embodiment, an adjusted data timestamp of the $i^{th}$ data packet is $T_i'$; and $T_i'$ satisfies the following condition:

$$T_i' = T_i - \sum_{j=0}^{i}\left(\left(\Delta f_j/f_{sys,j}\right) \times T_s\right),$$

where
$T_s$ is a sampling cycle, $f_{sys,j}$ is a system clock frequency corresponding to a moment at which a $j^{th}$ data packet is collected, and j satisfies $0 \leq j \leq i$.

According to a third aspect, an embodiment of this application provides a data processing apparatus, including:
a time adjustment unit, configured to adjust a data timestamp $T_i$ of an $i^{th}$ data packet based on error information, where the error information is a clock frequency error or a time error, the clock frequency error is a difference between a system clock frequency and a reference clock frequency, and the time error is a difference between a system time and a reference time. The $i^{th}$ data packet is any data packet collected by a system in a time period in which there is no reference clock, i is a positive integer, and $T_i$ is a system time corresponding to a collection moment of the $i^{th}$ data packet.

In an embodiment, the error information is a clock frequency error $\Delta f$, and the clock frequency error $\Delta f = f_{sys} - f_r$ is a fixed value, where $f_{sys}$ is a system clock frequency corresponding to a moment at which the reference clock is detected again, and $f_r$ is a reference clock frequency.

In an embodiment, an adjusted data timestamp of the $i^{th}$ data packet is $T_i'$; and $T_i'$ satisfies the following condition:

$$T_i' = T_i - (\Delta f/f_{sys}) \times T_s \times i, \text{ where}$$

$T_s$ is a sampling cycle.

In an embodiment, the error information is a time error T or a time error t, the time error T is a difference between a reference time corresponding to a first moment and a system time corresponding to the first moment, and the time error t satisfies the following condition:

$$t = T/K, \text{ where}$$

the first moment is a moment at which the reference clock is detected again after the $i^{th}$ data packet is collected, and K is a quantity of data packets collected in the time period in which there is no reference clock.

In an embodiment, an adjusted data timestamp of the $i^{th}$ data packet is $T_i'$; and $T_i'$ satisfies the following condition:

$$T_i' = T_i - T/K \times i, \text{ or}$$

$$T_i' = T_i - t \times i.$$

In an embodiment, the error information is a clock frequency error; and when a $j^{th}$ data packet is collected, the clock frequency error $\Delta f_j$ satisfies the following condition:

$$\Delta f_j = T_s \times S \times j, \text{ where}$$

$T_s$ is a sampling cycle, S is an increase rate of the clock frequency error, S is a real number, and j satisfies $0 \leq j \leq i$.

In an embodiment, an adjusted data timestamp of the $i^{th}$ data packet is $T_i'$; and $T_i'$ satisfies the following condition:

$$T_i' \in [T_{min}, T_{max}], \text{ where when } S \geq 0,$$

$$T_{min} = T_i - \sum_{j=0}^{i} \left( (\Delta f_j/f_{sys,j}) \times T_s \right) \text{ and } T_{max} = T_i - \sum_{j=0}^{i-1} \left( (\Delta f_j/f_{sys,j}) \times T_s \right);$$

or when $S \leq 0$, $$T_{min} = T_i - \sum_{j=0}^{i-1} \left( (\Delta f_j/f_{sys,j}) \times T_s \right) \text{ and } T_{max} = T_i - \sum_{j=0}^{i} \left( (\Delta f_j/f_{sys,j}) \times T_s \right);$$

and $f_{sys,j}$ is a system clock frequency corresponding to a moment at which the $j^{th}$ data packet is collected.

In an embodiment, the error information includes a clock frequency error $\Delta f_j$ of the any data packet; and the clock frequency error $\Delta f_j$ is determined based on a correspondence between a locally stored clock frequency error of the any data packet collected by the system in the time period in which there is no reference clock and a sampling condition.

In an embodiment, an adjusted data timestamp of the $i^{th}$ data packet is $T_i'$; and $T_i'$ satisfies the following condition:

$$T_i' = T_i - \sum_{j=0}^{i} \left( (\Delta f_j/f_{sys,j}) \times T_s \right),$$

where $T_s$ is a sampling cycle, $f_{sys,j}$ is a system clock frequency corresponding to a moment at which a $j^{th}$ data packet is collected, and j satisfies $0 \leq j \leq i$.

In an embodiment, the data processing apparatus further includes a system work log output unit. The system work log output unit is configured to output a system work log, and the system work log includes a data timestamp of a data packet collected by a clock synchronization network in the time period in which there is no reference clock.

According to a fourth aspect, an embodiment of this application provides a computer-readable storage medium. The computer-readable storage medium stores a program or instructions. When the program or the instructions are run on a computer, the computer is enabled to perform the method in the first aspect or any embodiment of the first aspect.

According to a fifth aspect, an embodiment of this application provides a chip or a chip system. The chip or the chip system includes at least one processor and an interface. The interface and the at least one processor are interconnected by using a line. The at least one processor is configured to run a computer program or instructions, to perform the method described in the first aspect or any embodiment of the first aspect.

The interface in the chip may be an input/output interface, a pin, a circuit, or the like.

The chip system in the foregoing aspect may be a system on chip (system on chip, SOC), or may be a baseband chip, or the like. The baseband chip may include a processor, a channel encoder, a digital signal processor, a modem, an interface module, and the like.

In an embodiment, the chip or the chip system described above in this application further includes at least one memory, and the at least one memory stores instructions. The memory may be an internal storage unit of the chip, for example, a register or a cache, or may be a storage unit of the chip (for example, a read-only memory or a random access memory).

According to a sixth aspect, an embodiment of this application provides a computer program or a computer program product, including code or instructions. When the code or the instructions are run on a computer, the computer is enabled to perform the method according to the first aspect or any embodiment of the first aspect.

According to a seventh aspect, an embodiment of this application provides a system, including the apparatus in the second aspect or the third aspect.

BRIEF DESCRIPTION OF DRAWINGS

To describe the technical solutions in the embodiments of the present invention more clearly, the following briefly describes the accompanying drawings for describing the embodiments. It is clear that the accompanying drawings in the following description show merely some embodiments of the present invention, and a person of ordinary skill in the art may still derive other drawings from these accompanying drawings without creative efforts.

DESCRIPTION OF EMBODIMENTS

The following describes the technical solutions in the embodiments of this application with reference to the accompanying drawings in the embodiments of this application.

Figure 1:
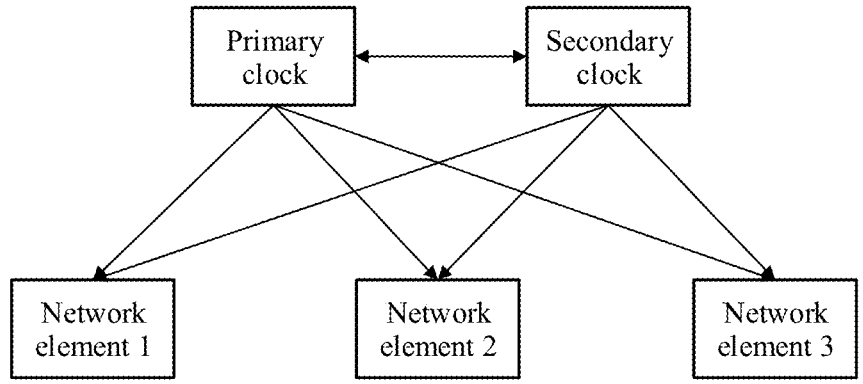
FIG. 1 is a schematic structural diagram of a clock synchronization network system according to an embodiment of this application.

For a clock synchronization network (for example, an intra-vehicle network or a 5G network), a runtime and a frequency of the entire system can be calibrated by using an external reference clock signal. For example, the clock synchronization network can calibrate a runtime and a frequency of a network system by receiving a global positioning system (GPS) signal or a BeiDou navigation satellite system (BDS) signal. FIG. 1 is a schematic structural diagram of a clock synchronization network system according to an embodiment of this application. The clock synchronization network system includes a primary clock and a secondary clock, and further includes one or more network elements such as a network element 1, a network element 2, and a network element 3 shown in FIG. 1. It may be understood that the secondary clock serves as a backup of the primary clock. When the primary clock fails, the secondary clock may serve as the primary clock, so that the network element in the clock synchronization network system maintains time and frequency synchronization with the secondary clock.

The network element in the clock synchronization network system may include but is not limited to a sensor, a playback device, a switch, a controller, a computing center, a storage center, and the like.

The sensor has an information collection capability, and may convert collected information into a signal and transmit the signal to a corresponding network device. Types of sensors may include but are not limited to a millimeter-wave radar, a laser radar, an ultrasonic radar, a camera, an inertial sensor, a speed sensor, an acceleration sensor, a humidity sensor, a light intensity sensor, and the like. The playback device is configured to prompt information, and may include but is not limited to a display, a speaker, a power amplification device, and the like. The switch may perform a routing switching function, and is configured to aggregate and relay various data services, such as an audio and video service, a synchronization message, and a control message. The switch may be a switch or a router. The controller, the computing center, and the storage center may all be configured to perform computing and control of a function, and may be independent or integrated with a gateway. In an embodiment, the controller, the computing center, and the storage center may be a vehicle-mounted computing platform or a vehicle-mounted computer, a domain controller, or a multi-domain controller, for example, an autonomous driving controller or an infotainment controller, or may be a data center that stores important data, for example, a black box or an event data recorder in a vehicle.

It should be noted that the foregoing network elements are logical concepts. In an actual network system, a form of a network element may be a physical device, a box, a board, or a function implemented by a chip or an area on a board. Alternatively, in the actual network system, a plurality of network elements may be integrated into one device. For example, the switch and the controller may be disposed on one circuit board. This is not limited in this embodiment.

Figure 2A:
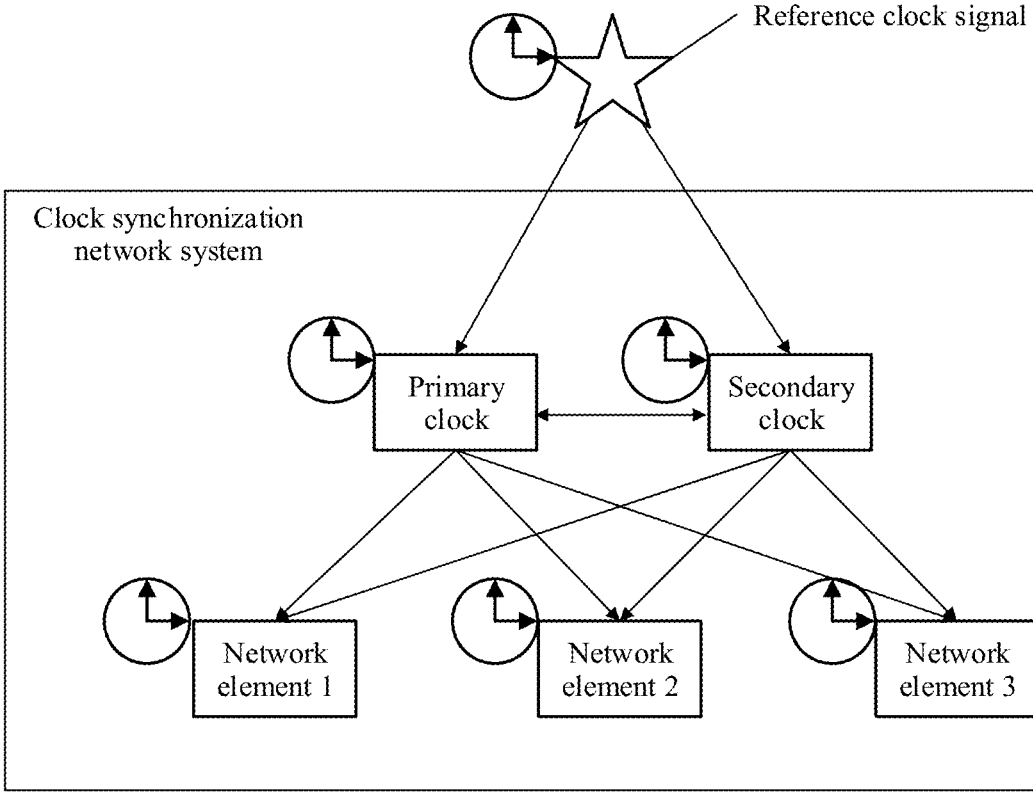
FIG. 2a is a schematic diagram of a scenario of a clock synchronization network system in a scenario in which there is a reference clock according to an embodiment of this application.
Figure 2B:
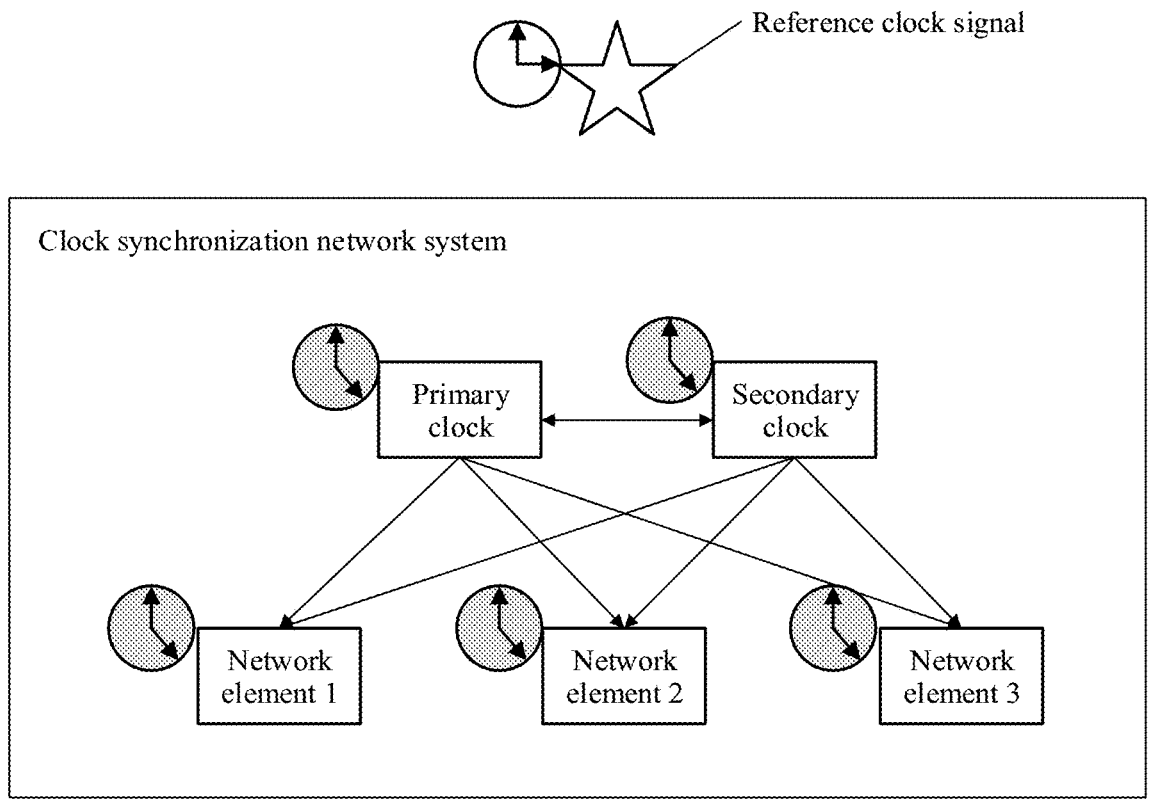
FIG. 2b is a schematic diagram of a scenario of a clock synchronization network system in a scenario in which there is no reference clock according to an embodiment of this application.

In an example, when the clock synchronization network system receives an external reference clock signal (for example, a GPS signal), the primary clock and the secondary clock may maintain time and frequency synchronization with the received external reference clock signal. In this case, one or more network elements in the clock synchronization network system all maintain time and frequency synchronization with the external reference clock signal, as shown in FIG. 2a. In an embodiment, if the clock synchronization network system cannot receive an external reference clock signal, that is, the system is in a time period in which there is no reference clock, one or more network elements in the clock synchronization network system may maintain time and frequency synchronization with the primary clock and the secondary clock, as shown in FIG. 2b. It should be noted that when the clock synchronization network system cannot receive an external reference clock signal, an error occurs between a system time and a reference time because the primary clock has no external reference clock signal input. For example, a reference time corresponding to a reference clock signal shown in FIG. 2b is inconsistent with system times of the primary clock, the secondary clock, and each network element.

It can be learned that, in a clock synchronization system running process, if no reference clock signal is input, an error occurs between a system clock and a reference clock. Consequently, a data timestamp of a work log or another data collected by the system in a time period in which there is no reference clock is inaccurate. For example, data recorded in the time period in which there is no reference clock includes a system work log, but there is a specific error between a data timestamp of the system work log and the reference time. Data in the system work log may be used for accident assessment and system debugging. Therefore, the system work log in the time period in which there is no reference clock cannot record a real status of the system.

To correct a data timestamp of data collected by a system in a time period in which there is no reference clock, an embodiment of this application provides a data processing method. In the method, a data timestamp of any data packet collected by the system in the time period in which there is no reference clock can be corrected based on a clock frequency error or a time error, so that a corrected system time of the data packet is consistent with a reference time. This improves accuracy of data record.

The following performs description with reference to a specific embodiment.

Figure 3:
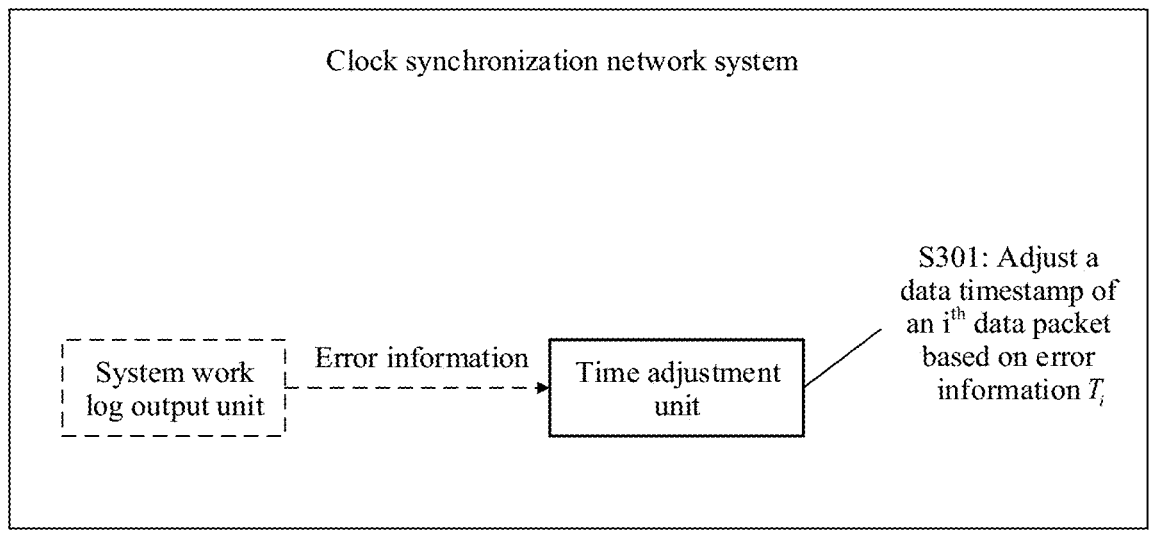
FIG. 3 is a schematic flowchart of a data processing method according to an embodiment of this application.

An embodiment of this application provides a data processing method. Refer to FIG. 3. The data processing method may be performed by a clock synchronization network system or one or more network elements in the system, for example, an in-vehicle network or a vehicle-mounted network element. The following uses an example in which the data processing method is performed by the clock synchronization network system for description. The data processing method includes the following operation:

S301: Adjust a data timestamp $T_i$ of an $i^{th}$ data packet based on error information.

In a running process of the clock synchronization network system, if no reference clock signal is input, it indicates that the clock synchronization network system is in a time period in which there is no reference clock. For example, when the clock synchronization network system is a vehicle-mounted communications system, if a vehicle enters an area without a GPS, for example, a tunnel or an underground parking lot, the system cannot receive a GPS signal, and therefore, is in the time period in which there is no reference clock.

In the time period in which there is no reference clock, because the system lacks an external reference clock signal input, a system time may produce an error. For example, the system time gradually slows down. The system time is time of a primary clock (and/or a secondary clock) of the clock synchronization network system in the time period in which there is no reference clock. For example, the system time is time of a primary clock, a secondary clock, and a plurality of network elements of the system shown in FIG. 2b.

When receiving the reference clock signal again, the clock synchronization network system may obtain a reference time. The reference time is time of the reference clock signal. For example, the reference time may be real time (for example, time of a GPS signal), or may be an assumed time. This is not limited in this embodiment.

If the reference time is inconsistent with the system time, the system may determine that an error exists between the system time and the reference time, and the system may obtain the error information. In an embodiment, the error information is obtained by the system when the clock synchronization network system detects the reference clock signal again after the time period in which there is no reference clock ends (for example, the vehicle drives out of the tunnel). For example, the error information is generated through detection calculation. In an embodiment, when the system detects the reference clock signal again, the system may determine the error information based on a generated system work log and the received reference clock signal.

The error information may be a clock frequency error or a time error. The clock frequency error is a difference between a system clock frequency and a reference clock frequency. For example, a clock frequency error of the system is a frequency difference between the system clock frequency and a clock frequency of a GPS signal. The time error is a difference between the system time and the reference time. For example, when the system receives the GPS signal again, the system determines that the time error is a time difference between the system time and a GPS time. After the clock synchronization network system determines the error information, the system may adjust the data timestamp $T_i$ of the $i^{th}$ data packet based on the error information.

The $i^{th}$ data packet is any data packet collected by the system in the time period in which there is no reference clock, and i is a positive integer. The data timestamp $T_i$ of the $i^{th}$ data packet is a system time at which the $i^{th}$ data packet is collected and that is recorded by the clock synchronization network system in the time period in which there is no reference signal. The clock synchronization network system collects data according to a specific sampling cycle, that is, the system records one data packet when passing each sampling cycle. For ease of description, in this embodiment, it is assumed that an end time of each sampling cycle is a data timestamp of each data packet, that is, the data timestamp of the $i^{th}$ data packet is an end time of an $i^{th}$ sampling cycle. Alternatively, it can be assumed that a start time of each sampling cycle is a data timestamp of each data packet. This is not limited in this embodiment.

For example, if the error information includes a time error of the $i^{th}$ data packet, the clock synchronization network system may obtain an adjusted data timestamp of the $i^{th}$ data packet by subtracting, based on the time error of the $i^{th}$ data packet, the time error of the $i^{th}$ data packet from the data timestamp of the $i^{th}$ data packet. It should be noted that the time error may be a positive number or a negative number. If the time error is a positive number, the system time in the time period in which there is no reference clock is later than the reference time. Alternatively, if the time error is a negative number, the system time in the time period in which there is no reference clock is earlier than the reference time. This is not limited in this embodiment.

For another example, if the error information includes a clock frequency error of the $i^{th}$ data packet, the clock synchronization network system may determine a time error of the $i^{th}$ data packet based on the clock frequency error of the $i^{th}$ data packet and a sampling cycle. Then, the time error of the $i^{th}$ data packet is subtracted from the data timestamp of the $i^{th}$ data packet based on the time error of the $i^{th}$ data packet, to obtain an adjusted data timestamp of the $i^{th}$ data packet. It may be understood that the adjusted data timestamp of the $i^{th}$ data packet represents real time at which the system collects the $i^{th}$ data packet when there is a reference clock signal. Therefore, after the data timestamp of the $i^{th}$ data packet is adjusted, the $i^{th}$ data packet can reflect a real status of the system. This improves accuracy of data record.

This embodiment of this application provides the data processing method. The clock synchronization network system may correct, based on the clock frequency error or the time error, the data timestamp of the any data packet collected by the system in the time period in which there is no reference clock. A corrected system time of the any data packet is consistent with the reference time. This can improve accuracy of data record.

The following describes the operation of adjusting the data timestamp of the $i^{th}$ data packet based on the time error or the clock frequency error in detail.

Figure 4:
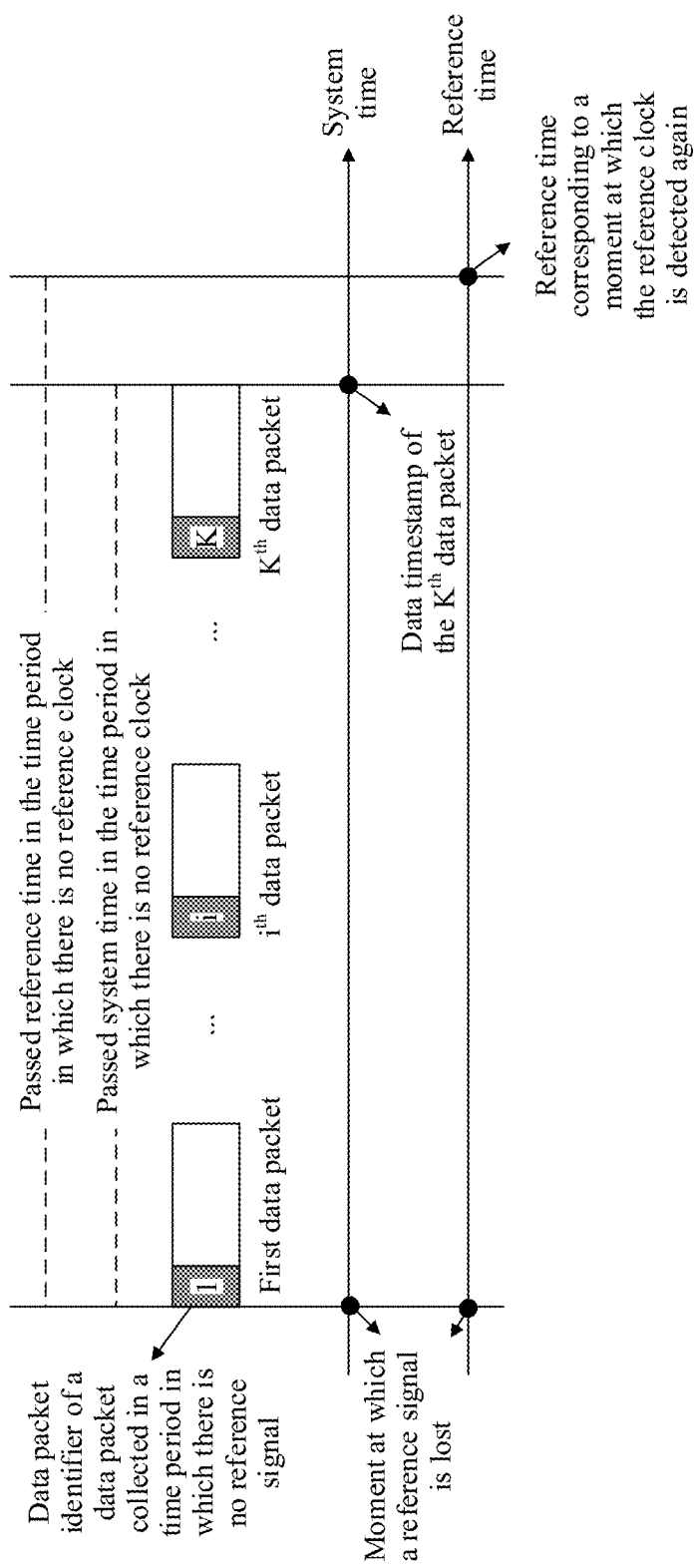
FIG. 4 is a schematic diagram of a relationship between a system time and a reference time according to an embodiment of this application.

FIG. 4 is a schematic diagram of a relationship between a system time and a reference time. The system collects data according to a fixed sampling cycle $T_s$, that is, the system collects data according to a same time interval. For example, the system collects data at an interval of 10 seconds (s), and $T_s=10$ s. In a time period in which there is no reference clock, the system may configure a data packet identifier without a reference signal for all collected data packets, as shown in FIG. 4. The data packet identifier may be set in a header of a data packet. For example, the data packet identifier occupies a bit of the header of the data packet to identify the data packet that is collected in the time period in which there is no reference clock. The data packet identifier may alternatively be set in another part of the data packet provided that it can identify the data packet that is collected in the time period in which there is no reference clock. A specific setting manner is not limited in this embodiment.

In the embodiments of this application, $T_s$ may be understood as a parameter, for example, $T_s=10$ s, and it is associated with a quantity N of clock cycles that a clock passes at a specific frequency in one Ts. That is, in a reference system of a system clock or a reference system of a reference clock, the clock passes N cycles in one $T_s$. In addition, in the reference system of the system clock or the reference system of the reference clock, after the clock passes N cycles, it is considered that the clock passes $T_s=10$ s, and data is collected again. That is, in the embodiments of this application, a value of $T_s$ is unassociated with a system clock or a reference clock that is in use.

When the system detects the reference clock signal again, the system may record two time periods: a system time $T_{sys}$ that the system passes in the time period in which there is no reference clock, and a reference time $T_r$ that the system passes in the time period in which there is the reference clock. The system time that the system passes in the time period in which there is no reference clock starts from a system time corresponding to a moment at which a reference signal is lost, and ends at a system time recorded in a data timestamp of a $K^{th}$ data packet, as shown in FIG. 4. In an embodiment, the reference time that the system passes in a data time period in which there is no reference clock starts from a reference time corresponding to the moment at which a reference signal is lost, and ends at a reference time corresponding to a moment at which the reference clock is detected again, as shown in FIG. 4.

It may be understood that, the system time that the system passes in the time period in which there is no reference clock may end at a system time corresponding to the moment at which the reference clock is detected again, or the system time that the system passes in the time period in which there is no reference clock may end at a system time at a moment between the system time recorded in the data timestamp of the $K^{th}$ data packet and the system time corresponding to the moment at which the reference clock is detected again. This is not limited in this embodiment.

Because the system time does not generate a deviation at a moment at which the system just losses the reference clock signal, in this embodiment, it is determined that the system time corresponding to the moment at which the reference signal is lost is consistent with the reference time corresponding to the moment at which the reference signal is lost. It should be noted that, when the system detects the reference clock signal again, the system does not configure the data packet identifier without the reference signal for the collected data packet. In this case, the system may determine, based on the data packet identifier of each data packet, a quantity of data packets collected by the system in the time period in which there is no reference clock. For example, the system collects K data packets in total in the time period in which there is no reference clock, shown in FIG. 4.

In an example, when there is the reference clock signal, a system time at which the system collects a data packet is consistent with the reference time, and the system collects data according to a fixed sampling cycle. When the system enters the time period in which there is no reference clock, because the clock synchronization network system has no reference clock, and it is assumed that the system clock is free-run, a specific error occurs between a system clock frequency and a reference clock frequency, and a clock frequency error between the system clock frequency and the reference clock frequency is a fixed value. In addition, the system can still maintain a fixed sampling cycle to collect data.

Therefore, a time error between a data timestamp of a data packet in each sampling cycle and the reference time may be continuously accumulated according to a rule of an arithmetic progression. In this case, the error information obtained by the system may be a clock frequency error $\Delta f$, a time error T, or a time error t. The following describes in detail three different types of error information in a system clock free-run scenario.

In an embodiment, the error information is a clock frequency error $\Delta f$, and the clock frequency error $\Delta f=f_{sys}-f_r$, where $f_{sys}$ is a system clock frequency corresponding to a moment at which the reference clock is detected again, and $f_r$ is a reference clock frequency. In the time period in which there is no reference clock, the system has only a system clock frequency for reference. When the system detects the reference clock again, the system can obtain a reference clock frequency. In this case, when the system detects the reference clock again, the system can record a system clock frequency corresponding to a moment at which the reference clock is detected again and the reference clock frequency corresponding to the moment at which the reference clock is detected again. It may be understood that the clock frequency error is a fixed value.

It should be noted that when the clock frequency error is a fixed value, the fixed value may be any positive or negative real number. In this embodiment, it is assumed that in a system clock free-run scenario, a clock frequency of the system fluctuates to a peak value within a short time period, that is, the clock frequency error of the system changes from 0 to the foregoing fixed value within a short time period. Therefore, in the system clock free-run scenario, a clock frequency error of any data packet collected by the system in the time period in which there is no reference clock is $\Delta f$.

Because there is the clock frequency error, a time error between the system time and the reference time is accumulated each time the system passes one sampling cycle $T_s$ after a moment at which a reference signal is lost, and an accumulated time amount is related to the clock frequency error $\Delta f$.

Figure 5A:
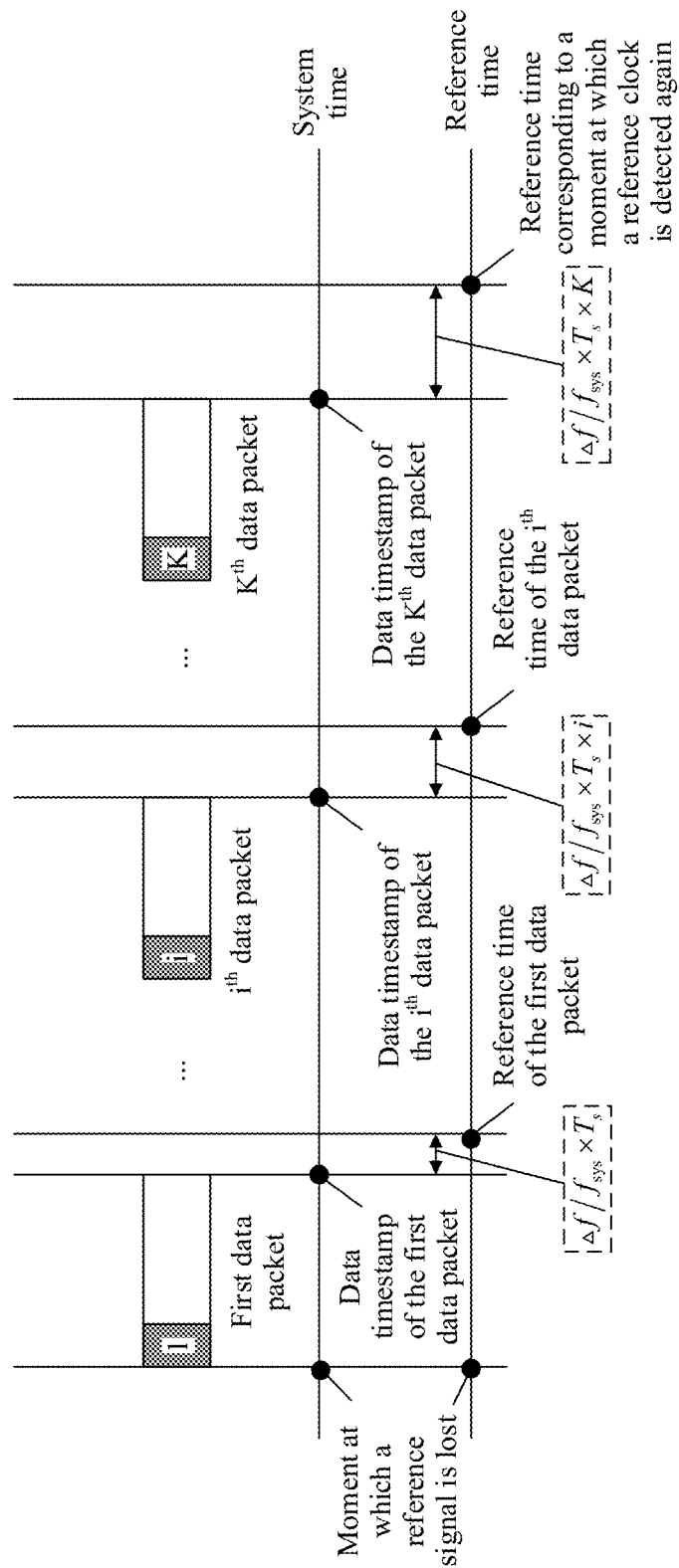
FIG. 5a is a schematic diagram of a clock frequency error in a system clock free-run scenario according to an embodiment of this application.

For example, the clock frequency error $\Delta f$ and a time error of any data packet collected in the time period in which there is no reference clock are shown in FIG. 5a. For an $i^{th}$ data packet, based on $\Delta f$, the sampling cycle $T_s$, and a data packet identifier of the $i^{th}$ data packet, the system may determine that a time error corresponding to the $i^{th}$ data packet is $\Delta f/f_{sys} \times T_s \times i$, where $f_{sys}$ is a reference clock frequency.

In an embodiment, if the system determines that the error information is the clock frequency error $\Delta f$, the system adjusts a data timestamp of the $i^{th}$ data packet based on the clock frequency error $\Delta f$. It is assumed that an adjusted data timestamp of the $i^{th}$ data packet is $T_i'$, and $T_i'$ satisfies the following condition:

$$T_i'=T_i-(\Delta f/f_{sys})\times T_s \times i, \text{ where}$$

$T_s$ is a sampling cycle.

For example, assuming that a system clock frequency is $f_{sys}=2$ Hz, and a reference clock frequency is $f_r=4$ Hz, the system may determine that a clock frequency error is $\Delta f=f_{sys}-f_r=2-4=-2$ Hz. It is assumed that a quantity of data packets collected in the time period in which there is no reference clock is K=10, and a sampling cycle is $T_s=0.5$ s. The system may further obtain that a system time $T_i$ corresponding to a collection moment of a fourth data packet is 11:00:00. In this case, for the fourth data packet, the system may determine that a time error of the data packet is $\Delta f/f_{sys} \times T_s \times i=-2$ Hz/2 Hz$\times 0.5$ s$\times 4=-2$ s. In this case, an adjusted data timestamp $T_i'$ of the fourth data packet is 11:00:02.

It may be understood that the adjusted data timestamp $T_i'$ may represent a reference time corresponding to a collection moment of the $i^{th}$ data packet. For example, the adjusted data timestamp $T_i'$ of the fourth data packet is 11:00:02, that is, it indicates that a reference time corresponding to the collection moment of the fourth data packet is 11:00:02. It should be noted that the foregoing example is merely an example. The sampling cycle may be a second-level sampling cycle, or may be a millisecond-level or microsecond-level sampling cycle. This is not limited in this embodiment.

Alternatively, the error information is the time error T or the time error t. The time error T is a difference between a reference time corresponding to a first moment and a system time corresponding to the first moment, and the time error t satisfies the following condition:

$t=T/K$, where the first moment is a moment at which the reference clock is detected again after the $i^{th}$ data packet is collected, and K is a quantity of data packets collected in the time period in which there is no reference clock.

Figure 5B:
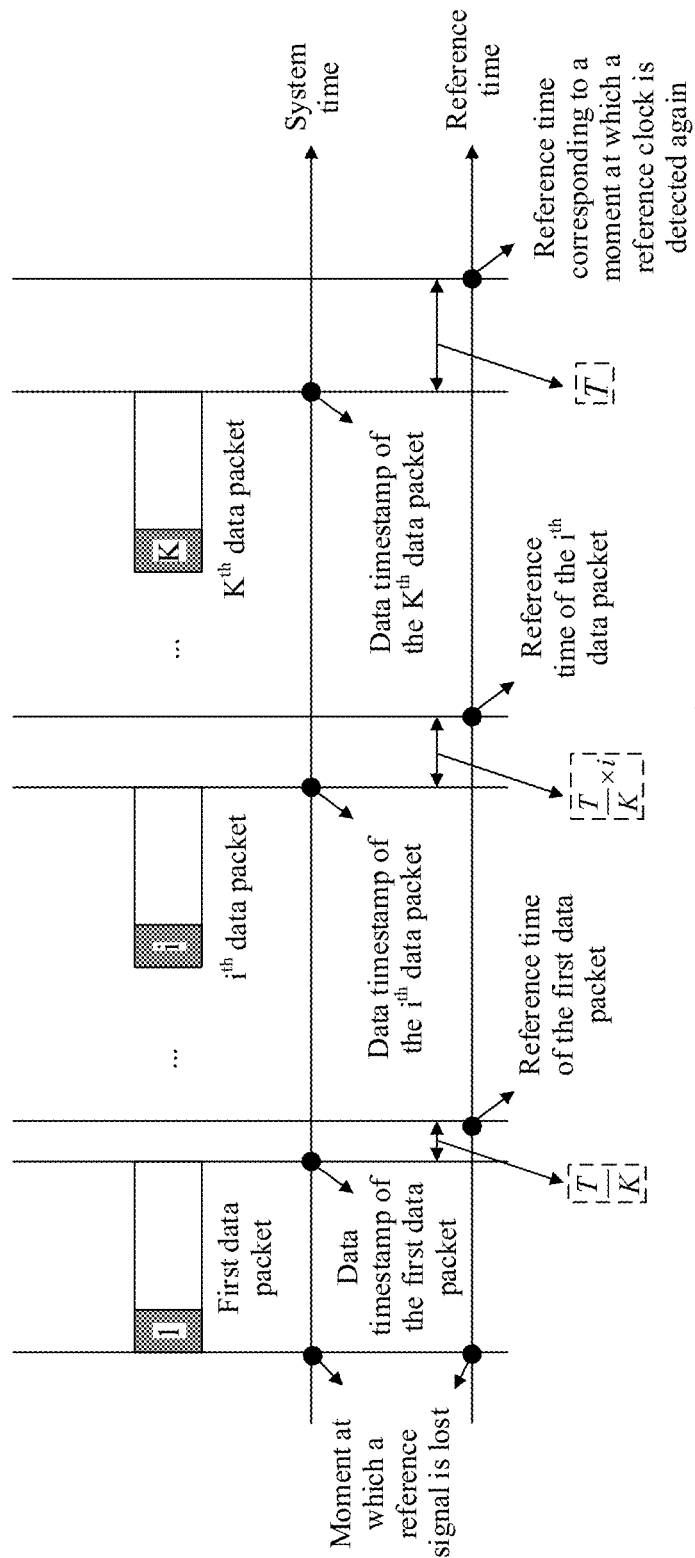
FIG. 5b is a schematic diagram of a time error in a system clock free-run scenario according to an embodiment of this application.

For example, the time error T is shown in FIG. 5b, that is, the time error T may be a difference between a reference time corresponding to a moment at which the reference clock is detected again and a data timestamp of the $K^{th}$ data packet. It may be understood that the data timestamp of the $K^{th}$ data packet may represent a system time corresponding to the moment at which the reference clock is detected again after the $i^{th}$ data packet is collected.

Figure 5C:
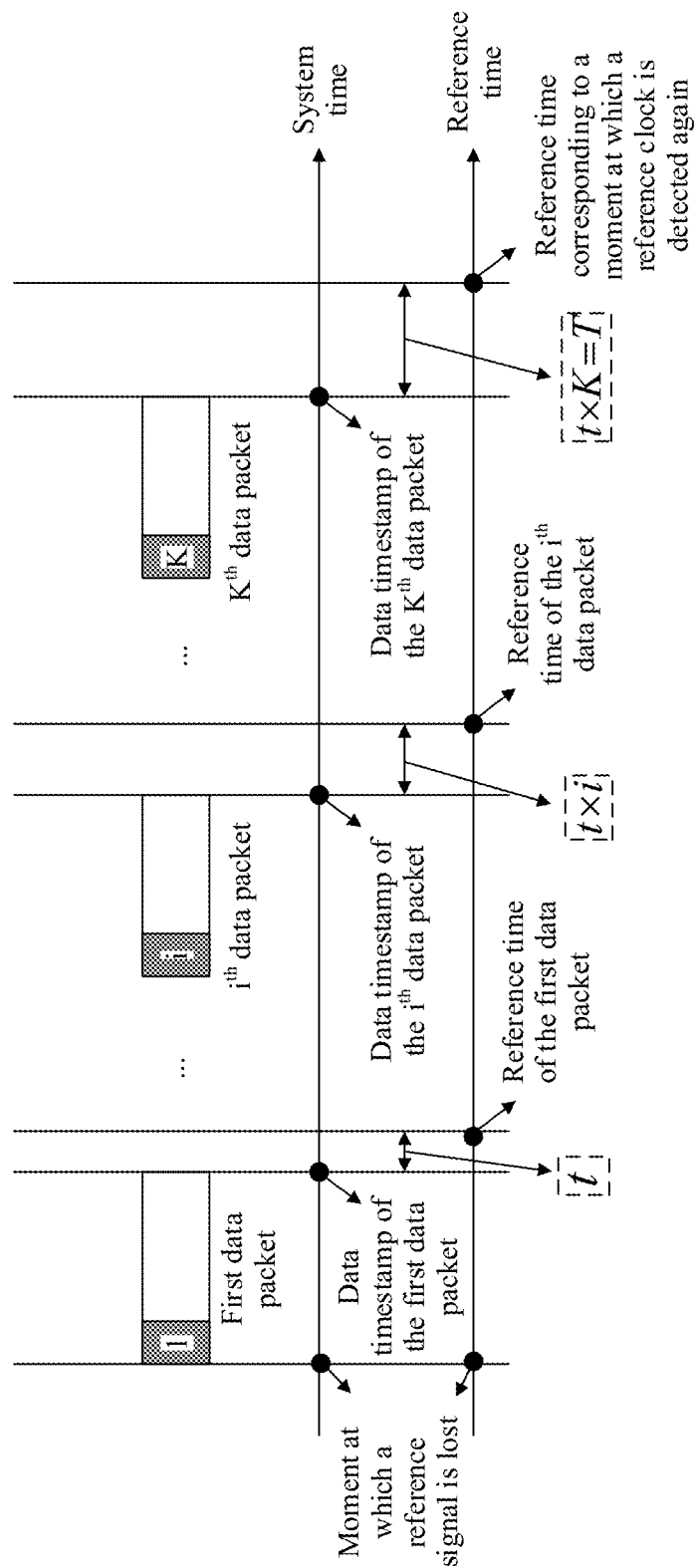
FIG. 5c is a schematic diagram of a time error in a system clock free-run scenario according to an embodiment of this application.

For another example, the time error satisfies t=T/K, as shown in FIG. 5c, that is, in the time period in which there is no reference clock, a time error between a data timestamp of a data packet in each sampling cycle and a reference time may be continuously accumulated according to a rule of an arithmetic progression whose tolerance is the time error t. It may be understood that a relationship between the time error T and the time error t is t=T/K, that is, the time error T and the time error t in this embodiment are two different representations of the time error.

Optionally, if the system determines that the error information is the time error T, the system may adjust the data timestamp of the $i^{th}$ data packet based on the time error T. It is assumed that an adjusted data timestamp of the $i^{th}$ data packet is $T_i'$, and $T_i'$ satisfies the following condition:

$T_i'=T_i-T/K\times i$.

For example, assuming the time error is T=−5 s, a quantity of data packets collected in the time period in which there is no reference clock is K=10. The system may obtain that a system time $T_i$ corresponding to a collection moment of a fourth data packet is 11:00:00. In this case, a time error corresponding to the fourth data packet is T/K×i=−5 s/10× 4=−2 s. The system determines, according to $T_i'=T_i-T/K\times i$, that an adjusted data timestamp $T_i'$ of the fourth data packet is 11:00:02. It may be understood that the adjusted data timestamp $T_i'$ may represent a reference time corresponding to a collection moment of the $i^{th}$ data packet. For example, the adjusted data timestamp $T_i'$ of the fourth data packet is 11:00:02, that is, it indicates that a reference time corresponding to the collection moment of the fourth data packet is 11:00:02.

In an embodiment, if the system determines that the error information is the time error t, the system adjusts the data timestamp of the $i^{th}$ data packet based on the time error t. It is assumed that an adjusted data timestamp of the $i^{th}$ data packet is $T_i'$, and $T_i'$ satisfies the following condition:

$T_i'=T_i-t\times i$.

For example, assuming the time error is T=−5 s, a quantity of data packets collected in the time period in which there is no reference clock is K=10. In this case, t=−0.5 s may be determined based on the time error T and the quantity K of the data packets collected in the time period in which there is no reference clock, that is, a time error between a data timestamp of a data packet in each sampling cycle and the reference time is continuously accumulated according to a rule of an arithmetic progression whose tolerance is −0.5. The system may obtain that the system time $T_i$ corresponding to the collection moment of the fourth data packet is 11:00:00. In this case, an adjusted data timestamp $T_i'$ of the fourth data packet is 11:00:02.

In an embodiment, it is assumed that a reference clock cycle is $T_r=0.25$ s, and correspondingly, a reference clock frequency is $f_r=4$ Hz. It is assumed that a system clock cycle is $T_{sys}=0.5$ s, and correspondingly, a system clock frequency is $f_{sys}=2$ Hz. A sampling cycle is $T_s=0.5$ s. Therefore, based on physical meaning of the clock frequency error in the foregoing examples, a calculation formula of a corrected data timestamp of the $i^{th}$ data packet may be deduced as follows:

$T_i'=T_i-(T_s\times i/T_r-T_s\times i/T_{sys})\times T_{sys}$.

Table 1 shows a relationship between a quantity of sampling cycles that a system passes, a quantity of system clock cycles, a system recording time, a quantity of reference clock cycles, a reference clock time, and a data timestamp correction of an $i^{th}$ data packet. It is assumed that the system collects one data packet in each sampling cycle, and the quantity of sampling cycles that the system passes is a quantity of data packets collected by the system.

TABLE 1

Relationship between a quantity of sampling cycles that a system passes, a quantity of system clock cycles, a system recording time, a quantity of reference clock cycles, a reference clock time, and a data timestamp correction of an $i^{th}$ data packet

| | | | | |
|---|---|---|---|---|
| Quantity of sampling cycles that a system passes | 1 | 2 | 3 | 4 |
| Quantity of system clock cycles | 2 | 4 | 6 | 8 |
| System recording time (s) | 0.25 × 2 = 0.5 | 0.25 × 4 = 1 | 0.25 × 6 = 1.5 | 0.25 × 8 = 2 |
| Quantity of reference clock cycles | 4 | 8 | 12 | 16 |
| Reference clock time (s) | 0.25 × 4 = 1 | 0.25 × 8 = 2 | 0.25 × 12 = 3 | 0.25 × 16 = 4 |
| Data timestamp correction of an $i^{th}$ data packet (s) | (0.5 × 1/0.25 − 0.5 × 1/0.5) × 0.5 = 0.5 | (0.5 × 2/0.25 − 0.5 × 2/0.5) × 0.5 = 1 | (0.5 × 3/0.25 − 0.5 × 3/0.5) × 0.5 = 1.5 | (0.5 × 4/0.25 − 0.5 × 4/0.5) × 0.5 = 2 |

The quantity of system clock cycles indicates that after there is no reference clock, the system still considers that a system clock cycle is 0.25 s, and the system still considers that the system passes two clock cycles while passing a first sampling cycle, that is, the system recording time is 0.5 s, as shown in the third row and the second column in Table 1. However, because of the clock frequency error, the system clock cycle becomes 0.5 s, that is, a time period in which the system actually passes two clock cycles is 1 s. In this case, a time error between the system time and the reference time is 0.5 s after the system passes the first sampling cycle, as shown in the sixth row and the second column in Table 1.

Similarly, when the quantity of sampling cycles that the system passes gradually increases, the time error between the system time and the reference time increases according to a rule of an arithmetic progression whose tolerance is 0.5, as shown in Table 1.

It can be learned that after the system adjusts the data timestamp of any data packet in the time period in which there is no reference clock, data in each data packet is data collected in each sampling cycle within the reference time, and the data in each data packet may reflect a real status of the system.

In an example, when there is the reference clock signal, a system time at which the system collects a data packet is consistent with the reference time, and the system collects data according to a fixed sampling cycle. When the system enters the time period in which there is no reference clock, because the clock synchronization network system has no reference clock, and it is assumed that a clock holding algorithm is used in the system, the clock frequency error of the system accumulates slowly. However, the system can still maintain a fixed sampling cycle to collect data.

Therefore, when a clock holdover algorithm is used in the system, the clock frequency error between the system clock frequency and the reference clock frequency gradually increases according to a specific proportion. Correspondingly, the time error between the system time and the reference time gradually increases. In this case, the error information obtained by the system may be the clock frequency error or a time error T. The following describes in detail two different types of error information in a scenario in which a clock holding algorithm is used in the system.

In an embodiment, the error information is the clock frequency error. In this embodiment, it is assumed that in the scenario in which the clock holding algorithm is used in the system, a clock frequency of the system slowly increases with a change of time. A clock frequency error of a $j^{th}$ data packet in the time period in which there is no reference clock is caused by accumulation of clock frequency errors from the first data packet to the $j^{th}$ data packet. When the $j^{th}$ data packet is collected, the clock frequency error $\Delta f_j$ satisfies the following condition:

$\Delta f_j = T_s \times S \times j$, where $T_s$ is a sampling cycle, S is an increase rate of the clock frequency error, S is a real number, and j satisfies $0 \leq j \leq i$.

It is assumed that the increase rate of the clock frequency error is a fixed value, that is, S is a fixed value. In this case, when the $j^{th}$ data packet is collected, the clock frequency error of the system is $T_s \times S \times j$. It can be learned that, in the time period in which there is no reference clock, each time the system collects a data packet, the clock frequency error of the system increases $T_s \times S$, that is, the clock frequency error of the system may be accumulated continuously according to a rule of an arithmetic progression whose tolerance is $T_s \times S$.

For example, it is assumed that the increase rate of the clock frequency error is S=1 Hz/s, the sampling cycle is $T_s=1$ s, and a quantity of collected data packets is K=10. In this case, according to the condition that the clock frequency error satisfies, the system may determine that a clock frequency error when a fourth data packet is collected is $\Delta f_4 = T_s \times S \times 4 = 4$ Hz.

It should be noted that, because there is the clock frequency error, a time error between the system time and the reference time is accumulated once when the system passes each sampling cycle $T_s$ after a moment at which a reference signal is lost, and an accumulated time amount is related to the clock frequency error.

Figure 6:
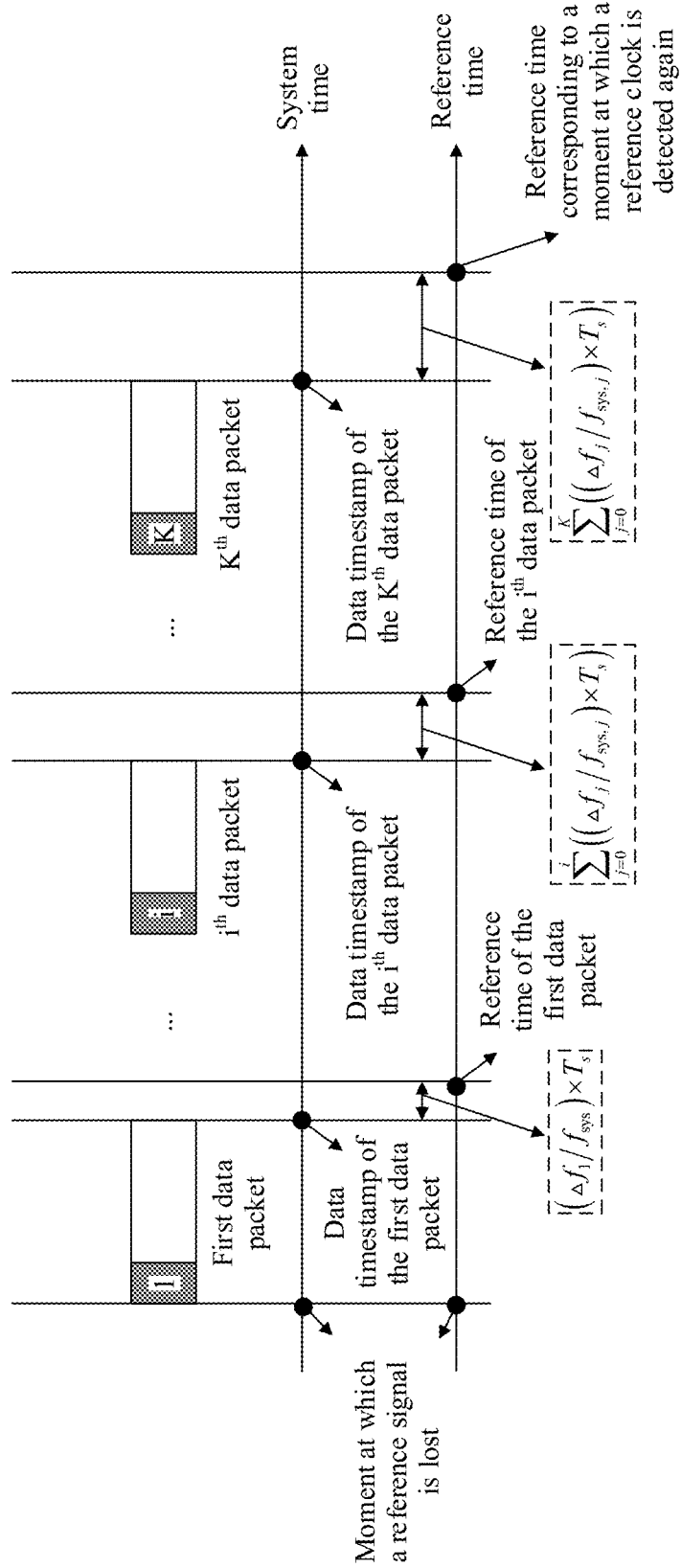
FIG. 6 is a schematic diagram of a time error in a scenario in which a clock holding algorithm is used in a system according to an embodiment of this application.

In an embodiment, the error information is the time error. The clock frequency error and a time error of any data packet collected in the time period in which there is no reference clock are shown in FIG. 6. A time error of the $i^{th}$ data packet is $$\sum_{j=0}^{i} ((\Delta f_j / f_{sys,j}) \times T_s),$$

and $f_{sys,j}$ is a system clock frequency corresponding to a moment at which a $j^{th}$ data packet is collected. It can be learned that the time error of the $i^{th}$ data packet is an accumulated time error in i sampling cycles from a sampling cycle in which the system collects the $0^{th}$ data packet to a sampling cycle in which the system collects the $i^{th}$ data packet.

The time error $$\sum_{j=0}^{i} ((\Delta f_j / f_{sys,j}) \times T_s)$$

of the $i^{th}$ data packet may be a positive number or a negative number, that is, it indicates that an increased system clock frequency error is a positive number or a negative number. This is not limited in this embodiment.

It should be noted that $\Delta f_0$ indicates a clock frequency error of the $0^{th}$ data packet collected by the system in the time period in which there is no reference clock. A system time of the $0^{th}$ data packet collected by the system in the time period in which there is no reference clock is a system time corresponding to a moment at which the system just losses the reference clock signal, that is, a reference time corresponding to the moment at which the system just losses the reference clock signal. In this case, there is no error between the system time of the $0^{th}$ data packet collected by the system in the time period in which there is no reference clock and the reference time, and the clock frequency error of the $0^{th}$ data packet is 0, that is, $\Delta f_0 = 0$.

For example, it is assumed that an increase rate of the clock frequency error is S=1 Hz/s, a sampling cycle is $T_s=1$ s, a system clock frequency is $f_{sys}=2$ Hz, and a quantity of collected data packets is K=10.

According to a clock frequency error formula $\Delta f_j = T_s \times S \times j$, the system determines that a clock frequency error when the first data packet is collected is $\Delta f_1 = 1$ Hz, a clock frequency error when the second data packet is collected is $\Delta f_2 = 2$ Hz, a clock frequency error when the third data packet is collected is $\Delta f_3 = 3$ Hz, and a clock frequency error when the fourth data packet is collected is $\Delta f_4 = 4$ Hz. In this case, according to a time error formula $$\sum_{j=0}^{i}\left(\left(\Delta f_j/f_{sys,j}\right)\times T_s\right)$$

of the $i^{th}$ data packet, the system may determine that a time error of the fourth piece of data is $$\sum_{j=0}^{i}\left(\left(\Delta f_j/f_{sys,j}\right)\times T_s\right) = \left(\left(1/2\right)+\left(2/2\right)+\left(3/2\right)+\left(4/2\right)\right)\times 1 = 5s.$$

It may be understood that, when the time error of the $i^{th}$ data packet is a positive number that is calculated by using the foregoing time error calculation formula $$\sum_{j=0}^{i}\left(\left(\Delta f_j/f_{sys,j}\right)\times T_s\right),$$

the calculated time error is a maximum value of the time error of the $i^{th}$ data packet. In an embodiment, if the time error of the $i^{th}$ data packet is a negative number that is calculated by using the foregoing time error calculation formula $$\sum_{j=0}^{i}\left(\left(\Delta f_j/f_{sys,j}\right)\times T_s\right),$$

the calculated time error is a minimum value of the time error of the $i^{th}$ data packet.

In an embodiment, the error information is the time error. In a possible case, in the time period in which there is no reference clock, when the system enters a $K^{th}$ sampling cycle, if the system detects the reference clock signal in a short time period before a $K^{th}$ data packet is collected, a system time that the system passes in the time period in which there is no reference clock is close to K sampling cycles, that is, a quantity of data packets collected by the system is approximately K. However, in the time period in which there is no reference clock, because the system does not collect the $K^{th}$ data packet, a quantity of collected data packets actually recorded by the system is K−1. An actual time error of the system is nearly one sampling cycle longer than a time error recorded by the system (for example, if a sampling cycle is 10 s, an actual time error of the system is 9 s longer than the time error recorded by the system). In this case, for an $i^{th}$ data packet, a time error of the $i^{th}$ data packet may be an accumulated time error in a plurality of sampling cycles from a sampling cycle in which the system collects the first data packet to a sampling cycle in which the system collects the $(i-1)^{th}$ data packet.

A time error of the $i^{th}$ data packet is $$\sum_{j=0}^{i-1}\left(\left(\Delta f_j/f_{sys,j}\right)\times T_s\right),$$

and $f_{sys,j}$ is a system clock frequency corresponding to a moment at which a $j^{th}$ data packet is collected. It can be learned that the time error of the $i^{th}$ data packet is an accumulated time error in i−1 sampling cycles from a sampling cycle in which the system collects the $0^{th}$ data packet to a sampling cycle in which the system collects the $(i-1)^{th}$ data packet.

The time error $$\sum_{j=0}^{i-1}\left(\left(\Delta f_j/f_{sys,j}\right)\times T_s\right)$$

of the $i^{th}$ data packet may be a positive number or a negative number, that is, it indicates that an increased system clock frequency error is a positive number or a negative number. This is not limited in this embodiment.

For example, it is assumed that an increase rate of the clock frequency error is S=1 Hz/s, a sampling cycle is $T_s$=1 s, a system clock frequency is $f_{sys}$=2 Hz, and a quantity of collected data packets is K=10.

According to a clock frequency error formula $\Delta f_j = T_s \times S \times j$, the system determines that a clock frequency error when the first data packet is collected is $\Delta f_1$=1 Hz, a clock frequency error when the second data packet is collected is $\Delta f_2$=2 Hz, and a clock frequency error when the third data packet is collected is $\Delta f_3$=3 Hz. In this case, according to a time error formula $$\sum_{j=0}^{i-1}\left(\left(\Delta f_j/f_{sys,j}\right)\times T_s\right)$$

of the fourth data packet, the system may determine that a time error of the fourth piece of data is $$\sum_{j=0}^{i-1}\left(\left(\Delta f_j/f_{sys,j}\right)\times T_s\right) = \left(\left(1/2\right)+\left(2/2\right)+\left(3/2\right)\right)\times 1 = 3s.$$

It may be understood that, when the time error of the $i^{th}$ data packet is a positive number that is calculated by using the foregoing time error calculation formula $$\sum_{j=0}^{i-1}\left(\left(\Delta f_j/f_{sys,j}\right)\times T_s\right),$$

the calculated time error is a minimum value of the time error of the $i^{th}$ data packet. In an embodiment, if the time error of the $i^{th}$ data packet is a negative number that is calculated by using the foregoing time error calculation formula $$\sum_{j=0}^{i-1}\left(\left(\Delta f_j/f_{sys,j}\right)\times T_s\right),$$

the calculated time error is a maximum value of the time error of the $i^{th}$ data packet.

In this case, according to the calculated maximum value and minimum value of the time error of the $i^{th}$ data packet in the foregoing example, the system may further determine an average value of the time error of the $i^{th}$ data packet. For example, if the maximum value of the time error of the fourth data packet is 5 s and the minimum value is 3 s, the system may determine that the average value of the time error of the fourth data packet is 4 s.

In an embodiment, according to the time error, the system may determine that the adjusted data timestamp of the $i^{th}$ data packet is $T_i'$, and $T_i'$ satisfies the following condition:

$$T_i' \in [T_{min}, T_{max}], \text{ where}$$

$$\text{when } S \geq 0, T_{min} = T_i - \sum_{j=0}^{i}\left((\triangle f_j / f_{sys,j}) \times T_s\right) \text{ and}$$

$$T_{max} = T_i - \sum_{j=0}^{i-1}\left((\triangle f_j / f_{sys,j}) \times T_s\right); \text{ or}$$

$$\text{when } S \leq 0, T_{min} = T_i - \sum_{j=0}^{i-1}\left((\triangle f_j / f_{sys,j}) \times T_s\right) \text{ and}$$

$$T_{max} = T_i - \sum_{j=0}^{i}\left((\triangle f_j / f_{sys,j}) \times T_s\right);$$

and $f_{sys,j}$ is a system clock frequency corresponding to a moment at which the $j^{th}$ data packet is collected.

For example, it is assumed that a system time corresponding to a collection moment of the fourth data packet is 11:00:00, and $S \geq 0$. According to $$T_{min} = T_i - \sum_{j=0}^{i}\left((\triangle f_j / f_{sys,j}) \times T_s\right),$$

the system may determine that the time error of the fourth data packet is 5 s. In this case, the system may determine, based on the time error of the fourth data packet and the system time corresponding to the fourth data packet, that an adjusted data timestamp $T_i'$ of the fourth data packet is 10:59:55, that is, a reference time corresponding to the collection moment of the fourth data packet is 10:59:55.

For another example, it is assumed that a system time corresponding to a collection moment of the fourth data packet is 11:00:00, and $S \geq 0$. According to $$T_{max} = T_i - \sum_{j=0}^{i-1}\left((\triangle f_j / f_{sys,j}) \times T_s\right),$$

the system may determine that the time error of the fourth data packet is 3 s. In this case, the system may determine, based on the time error of the fourth data packet and the system time corresponding to the fourth data packet, that an adjusted data timestamp $T_i'$ of the fourth data packet is 10:59:57, that is, a reference time corresponding to the collection moment of the fourth data packet is 10:59:57.

For another example, a minimum value of the adjusted data timestamp of the fourth data packet determined in the foregoing example is 10:59:55, and a maximum value of the adjusted data timestamp of the fourth data packet is 10:59:57. In this case, the system may determine that a reference time corresponding to the collection moment of the fourth data packet is any value in a time period of 10:59:55 to 10:59:57.

It can be learned that after the system adjusts the data timestamp of any data packet in the time period in which there is no reference clock, data in each data packet is data collected in each sampling cycle within the reference time, and the data in each data packet may reflect a real status of the system.

In an example, it is assumed that the clock synchronization system has obtained first data when the system performs a system test before use. The first data is data that changes with time and that is of a clock frequency error of the system under different sampling conditions when there is no reference clock. The first data may be prestored in the system.

The different sampling conditions may include but are not limited to environment detection parameters such as different ambient temperatures and different ambient humidities. The data that changes with time and that is of the clock frequency error under different sampling conditions may include a correspondence between a clock frequency error of any data packet collected by the system in the time period in which there is no reference clock and a sampling condition. The correspondence may be stored in the system in a form of a table, or may be stored in the system in another form (for example, a schematic diagram). This is not limited in this embodiment.

The following uses a table as an example to describe the correspondence. Table 2 is a correspondence between a clock frequency error of any data packet collected by a system in a time period in which there is no reference clock and a sampling condition. The usage condition includes different ambient temperatures, as shown in Table 2.

TABLE 2

Correspondence between clock frequency errors of any data packet collected by a system in a time period in which there is no reference clock, different ambient temperatures, and sampling cycles

| Sampling cycle | Ambient temperature | | | |
|---|---|---|---|---|
| | 0° C. | 10° C. | 20° C. | 30° C. |
| | Clock frequency error | | | |
| 10 s | S01 | S02 | S03 | S04 |
| 20 s | S11 | S12 | S13 | S14 |
| 30 s | S21 | S22 | S23 | S24 |

The clock frequency error shown in Table 2 may be a determined value. For example, S01=300 Hz (Hz), which indicates that when the ambient temperature is 0° C. and the sampling cycle is 10 s, the clock frequency error of any data packet collected by the system in the time period in which there is no reference clock is 300 Hz. In an embodiment, the clock frequency error shown in Table 2 may also be in another form. For example, the clock frequency error S01 is a binary relationship whose variable is an ambient temperature and a sampling cycle. This is not limited in this embodiment.

The system prestores the correspondence between the clock frequency error of any data packet collected by the system in the time period in which there is no reference clock and the sampling condition, that is, for the $i^{th}$ data packet, a clock frequency error $\triangle f_i$ of the $i^{th}$ data packet may be determined.

In an embodiment, when the system detects the reference clock signal again, the system may determine, based on the correspondence, that a time error of the $i^{th}$ data packet is $$\sum_{j=1}^{i}\left((\Delta f_j/f_{sys})\times T_s\right),$$

and $T_s$ is a sampling cycle. It may be understood that, for the $i^{th}$ data packet, the time error of the $i^{th}$ data packet is caused by accumulation of clock frequency errors from the first data packet to the $i^{th}$ data packet collected by the system in a time period in which there is no reference clock.

In an embodiment, the system may adjust the data timestamp of the $i^{th}$ data packet based on the time error T of the $i^{th}$ data packet. It is assumed that an adjusted data timestamp of the $i^{th}$ data packet is $T_i'$, and $T_i'$ satisfies the following condition:

$$T_i' = T_i - \sum_{j=1}^{i}\left((\Delta f_j/f_{sys})\times T_s\right),$$

where $T_s$ is a sampling cycle, j is a positive integer, and j≤i.

In an embodiment, the sampling cycle in the time error calculation formula and the calculation formula for adjusting the data timestamp of the $i^{th}$ data packet may alternatively be a second cycle. The second cycle is an environment detection cycle corresponding to the sampling condition. For example, when the sampling conditions are different ambient temperatures, the second cycle is an ambient temperature detection cycle.

For example, if the second period is an ambient temperature detection cycle, it is assumed that the ambient temperature detection cycle is twice the sampling cycle. For example, the sampling cycle is 10 s, and the ambient temperature detection period is 20 s. The system determines, based on the sampling cycle, that a quantity of data packets collected by the system in the time period in which there is no reference clock is 10. In this case, the system may divide, based on the ambient temperature detection cycle, the data packets collected in the time period in which there is no reference clock into a set of five data packets. For example, a first data packet and a second data packet belongs to a first data packet set, and a third data packet and a fourth data packet belongs to a second data packet set. In this case, for each data packet set, the system may separately determine a clock frequency error of each data packet set based on the correspondence. For example, a clock frequency error of the first data packet set is the corresponding clock frequency error S01 when the ambient temperature is 0° C., that is, clock frequency errors of both the first data packet and the second data packet are S01. For another example, a clock frequency error of the second data packet set is the corresponding clock frequency error S02 when the ambient temperature is 10° C., that is, clock frequency errors of both the third data packet and the fourth data packet are S02.

It may be understood that, because an environment change cycle is generally greater than the system sampling cycle, when the system calculates and determines, by using the second cycle, the clock frequency error and adjusts the data timestamp of the $i^{th}$ data packet, a calculation amount of the system can be reduced.

It can be learned that the system may estimate, based on historical data or time-frequency error data obtained when the system is tested, a clock frequency error of any data packet collected by the system in the time period in which there is no reference signal. Further, the system calculates, based on the clock frequency error, a time error of any data packet collected in the time period in which there is no reference clock, to adjust a data timestamp of any data packet collected in the time period in which there is no reference clock. After the system adjusts the data timestamp of any data packet in the time period in which there is no reference clock, data in each data packet is data collected in each sampling cycle within the reference time, and the data in each data packet may reflect a real status of the system.

Figure 7:
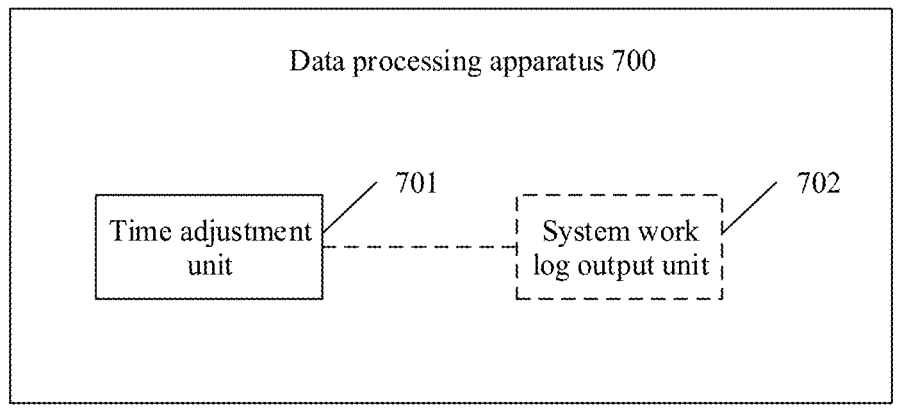
FIG. 7 is a schematic structural diagram of a data processing apparatus according to an embodiment of this application.
Figure 8:
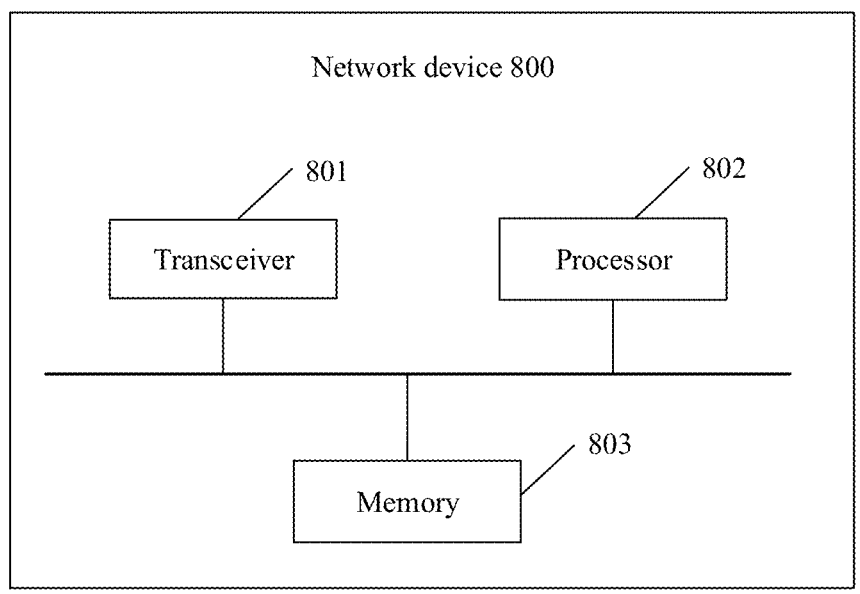
FIG. 8 is a schematic structural diagram of a network device according to an embodiment of this application.

The following describes an apparatus and a device in the embodiments of this application in detail with reference to FIG. 7 and FIG. 8.

An embodiment of this application provides a data processing apparatus. As shown in FIG. 7, a data processing apparatus 700 may be configured to implement the data processing method in the embodiments of this application. The data processing apparatus 700 may include:

a time adjustment unit 701, configured to adjust a data timestamp $T_i$ of an $i^{th}$ data packet based on error information, where the error information is a clock frequency error or a time error, the clock frequency error is a difference between a system clock frequency and a reference clock frequency, and the time error is a difference between a system time and a reference time; and the $i^{th}$ data packet is any data packet collected by a system in a time period in which there is no reference clock, i is a positive integer, and $T_i$ is a system time corresponding to a collection moment of the $i^{th}$ data packet. For an embodiment, refer to the detailed description in S301 in the embodiment shown in FIG. 3. Details are not described herein again.

In an embodiment, the error information is a clock frequency error $\Delta f$, and the clock frequency error $\Delta f = f_{sys} - f_r$ is a fixed value, where $f_{sys}$ is a system clock frequency corresponding to a moment at which the reference clock is detected again, and $f_r$ is a reference clock frequency. For an embodiment, refer to the detailed description of the clock frequency error in the embodiments shown in FIG. 3 and FIG. 5a. Details are not described herein again.

In an embodiment, an adjusted data timestamp of the $i^{th}$ data packet is $T_i'$; and $T_i'$ satisfies the following condition:

$T_i' = T_i - (\Delta f/f_{sys}) \times T_s \times i$, where $T_s$ is a sampling cycle. For an embodiment, refer to the detailed description of the clock frequency error and the adjusted data timestamp of the $i^{th}$ data packet in the embodiments shown in FIG. 3 and FIG. 5a. Details are not described herein again.

In an embodiment, the error information is a time error T or a time error t, the time error T is a difference between a reference time corresponding to a first moment and a system time corresponding to the first moment, and the time error t satisfies the following condition:

$t = T/K$, where the first moment is a moment at which the reference clock is detected again after the $i^{th}$ data packet is collected, and K is a quantity of data packets collected in the time period in which there is no reference clock. For an embodiment, refer to the detailed description of the time error in the embodiments shown in FIG. 3, FIG. 5b, and FIG. 5c. Details are not described herein again.

In an embodiment, an adjusted data timestamp of the $i^{th}$ data packet is $T_i'$; and $T_i'$ satisfies the following condition:

$T_i' = T_i - T/K \times i$, or $T_i' = T_i - t \times i$.

For specific implementation, refer to the detailed description of the time error and the adjusted data timestamp of the $i^{th}$ data packet in the embodiments shown in FIG. 3, FIG. 5b, and FIG. 5c. Details are not described herein again.

In an embodiment, the error information is a clock frequency error; and when a $j^{th}$ data packet is collected, the clock frequency error $\Delta f_j$ satisfies the following condition:

$$\Delta f_j = T_s \times S \times j, \text{ where}$$

$T_s$ is a sampling cycle, S is an increase rate of the clock frequency error, S is a real number, and j satisfies $0 \leq j \leq i$. For an embodiment, refer to the detailed description of the clock frequency error in the embodiments shown in FIG. 3 and FIG. 6. Details are not described herein again.

In an embodiment, an adjusted data timestamp of the $i^{th}$ data packet is $T_i'$; and $T_i'$ satisfies the following condition:

$$T_i' \in [T_{min}, T_{max}], \text{ where}$$

$$\text{when } S \geq 0, T_{min} = T_i - \sum_{j=0}^{i}\left((\Delta f_j/f_{sys,j}) \times T_s\right) \text{ and}$$

$$T_{max} = T_i - \sum_{j=0}^{i-1}\left((\Delta f_j/f_{sys,j}) \times T_s\right); \text{ or}$$

$$\text{when } S \leq 0, T_{min} = T_i - \sum_{j=0}^{i-1}\left((\Delta f_j/f_{sys,j}) \times T_s\right) \text{ and}$$

$$T_{max} = T_i - \sum_{j=0}^{i}\left((\Delta f_j/f_{sys,j}) \times T_s\right);$$

and $f_{sys,j}$ is a system clock frequency corresponding to a moment at which the $j^{th}$ data packet is collected.

For an embodiment, refer to the detailed description of the clock frequency error and the adjusted data timestamp of the $i^{th}$ data packet in the embodiments shown in FIG. 3 and FIG. 6. Details are not described herein again.

In an embodiment, the error information includes a clock frequency error $\Delta f_j$ of the any data packet; and the clock frequency error $\Delta f_j$ is determined based on a correspondence between a locally stored clock frequency error of the any data packet collected by the system in the time period in which there is no reference clock and a sampling condition. For an embodiment, refer to the detailed description of the clock frequency error in the embodiment shown in Table 2. Details are not described herein again.

In an embodiment, an adjusted data timestamp of the $i^{th}$ data packet is $T_i'$; and $T_i'$ satisfies the following condition:

$$T_i' = T_i - \sum_{j=0}^{i}\left((\Delta f_j/f_{sys,j}) \times T_s\right),$$

where $T_s$ is a sampling cycle, $f_{sys,j}$ is a system clock frequency corresponding to a moment at which a $j^{th}$ data packet is collected, and j satisfies $0 \leq j \leq i$. For an embodiment, refer to the detailed description of the clock frequency error and the adjusted data timestamp of the $i^{th}$ data packet in the embodiment shown in Table 2. Details are not described herein again.

In an embodiment, the data processing apparatus 700 may further include a system work log output unit 702. The system work log output unit 702 is configured to output a system work log, where the system work log includes a data timestamp of a data packet collected by a clock synchronization network in the time period in which there is no reference clock. For an embodiment, refer to the detailed description in the embodiment shown in FIG. 3. Details are not described herein again.

In an embodiment, related functions implemented by the units in FIG. 7 may be implemented by using a processor. FIG. 8 is a schematic structural diagram of a network device according to an embodiment of this application. The network device may be a device (for example, a chip) that has a data processing function described in the embodiments of this application. The network device 800 may include a transceiver 801, at least one processor 802, and a memory 803. The transceiver 801, the processor 802, and the memory 803 may be connected to each other by using one or more communications buses, or may be connected to each other in another manner.

The transceiver 801 may be configured to send information and receive information. It may be understood that the transceiver 801 is a general term, and may include a receiver and a transmitter. For example, the receiver is configured to receive a clock synchronization signal.

The processor 802 may be configured to process data of the network device, or process information received by the transceiver 801. For example, the processor 802 may invoke program code stored in the memory 803, to adjust a data timestamp of a data packet. The processor 802 may include one or more processors. For example, the processor 802 may be one or more central processing units (CPUs), a network processor (NP), a hardware chip, or any combination thereof. When the processor 802 is a CPU, the CPU may be a single-core CPU, or may be a multi-core CPU.

The memory 803 is configured to store the program code. The memory 803 may include a volatile memory (volatile memory), for example, a random access memory (RAM); the memory 803 may also include a nonvolatile memory, for example, a read-only memory (read-only memory, ROM), a flash memory, a hard disk drive (HDD), or a solid-state drive (SSD); and the memory 803 may further include a combination of the foregoing types of memories.

The processor 802 may be configured to implement the data processing method in the embodiments of this application. An embodiment is as follows:

adjusting a data timestamp $T_i$ of an $i^{th}$ data packet based on error information, where the error information is a clock frequency error or a time error, the clock frequency error is a difference between a system clock frequency and a reference clock frequency, and the time error is a difference between a system time and a reference time. The $i^{th}$ data packet is any data packet collected by a system in a time period in which there is no reference clock, i is a positive integer, and $T_i$ is a system time corresponding to a collection moment of the $i^{th}$ data packet. For an embodiment, refer to the detailed description in the embodiment shown in FIG. 3. Details are not described herein again.

In an embodiment, the error information is a clock frequency error $\Delta f$, and the clock frequency error $\Delta f = f_{sys} - f_r$ is a fixed value, where $f_{sys}$ is a system clock frequency corresponding to a moment at which the reference clock is detected again, and $f_r$ is a reference clock frequency. For an embodiment, refer to the detailed description of the clock frequency error in the embodiments shown in FIG. 3 and FIG. 5a. Details are not described herein again.

In an embodiment, an adjusted data timestamp of the $i^{th}$ data packet is $T_i'$; and $T_i'$ satisfies the following condition:

$T_i'=T_i-(\Delta f/f_{sys})\times T_s\times i$, where $T_s$ is a sampling cycle. For an embodiment, refer to the detailed description of the clock frequency error and the adjusted data timestamp of the $i^{th}$ data packet in the embodiments shown in FIG. 3 and FIG. 5a. Details are not described herein again.

In an embodiment, the error information is a time error T or a time error t, the time error T is a difference between a reference time corresponding to a first moment and a system time corresponding to the first moment, and the time error t satisfies the following condition:

$t=T/K$, where the first moment is a moment at which the reference clock is detected again after the $i^{th}$ data packet is collected, and K is a quantity of data packets collected in the time period in which there is no reference clock. For a specific implementation, refer to the detailed description of the time error in the embodiments shown in FIG. 3, FIG. 5b, and FIG. 5c. Details are not described herein again.

In an embodiment, an adjusted data timestamp of the $i^{th}$ data packet is $T_i'$; and $T_i'$ satisfies the following condition:

$T_i'=T_i-T/K\times i$, or $T_i'=T_i-t\times i$.

For specific implementation, refer to the detailed description of the time error and the adjusted data timestamp of the $i^{th}$ data packet in the embodiments shown in FIG. 3, FIG. 5b, and FIG. 5c. Details are not described herein again.

In an embodiment, the error information is a clock frequency error; and when a $j^{th}$ data packet is collected, the clock frequency error $\Delta f_j$ satisfies the following condition:

$\Delta f_j = T_s \times S \times j$, where $T_s$ is a sampling cycle, S is an increase rate of the clock frequency error, S is a real number, and j satisfies $0 \leq j \leq i$. For a specific implementation, refer to the detailed description of the clock frequency error in the embodiments shown in FIG. 3 and FIG. 6. Details are not described herein again.

In an embodiment, an adjusted data timestamp of the $i^{th}$ data packet is $T_i'$; and $T_i'$ satisfies the following condition:

$T_i' \in [T_{min}, T_{max}]$, where when $S \geq 0$, $T_{min} = T_i - \sum_{j=0}^{i}\left((\Delta f_j/f_{sys,j}) \times T_s\right)$ and $T_{max} = T_i - \sum_{j=0}^{i-1}\left((\Delta f_j/f_{sys,j}) \times T_s\right)$; or when $S \leq 0$, $T_{min} = T_i - \sum_{j=0}^{i-1}\left((\Delta f_j/f_{sys,j}) \times T_s\right)$ and $T_{max} = T_i - \sum_{j=0}^{i}\left((\Delta f_j/f_{sys,j}) \times T_s\right)$;

and $f_{sys,j}$ is a system clock frequency corresponding to a moment at which the $j^{th}$ data packet is collected.

In an embodiment, the error information includes a clock frequency error $\Delta f_j$ of the any data packet; and the clock frequency error $\Delta f_j$ is determined based on a correspondence between a locally stored clock frequency error of the any data packet collected by the system in the time period in which there is no reference clock and a sampling condition. For a specific implementation, refer to the detailed description of the clock frequency error in the embodiment shown in Table 2. Details are not described herein again.

In an embodiment, an adjusted data timestamp of the $i^{th}$ data packet is $T_i'$; and $T_i'$ satisfies the following condition:

$$T_i' = T_i - \sum_{j=0}^{i}\left((\Delta f_j/f_{sys,j}) \times T_s\right),$$

where $T_s$ is a sampling cycle, $f_{sys,j}$ is a system clock frequency corresponding to a moment at which a $j^{th}$ data packet is collected, and j satisfies $0 \leq j \leq i$. For a specific implementation, refer to the detailed description of the clock frequency error and the adjusted data timestamp of the $i^{th}$ data packet in the embodiment shown in Table 2. Details are not described herein again.

An embodiment of this application provides a computer-readable storage medium. The computer-readable storage medium stores a program or instructions. When the program or the instructions are run on a computer, the computer is enabled to perform the data processing method in the embodiments of this application.

An embodiment of this application provides a chip or a chip system. The chip or the chip system includes at least one processor and an interface. The interface and the at least one processor are interconnected by using a line. The at least one processor is configured to run a computer program or instructions, to perform the data processing method in the embodiments of this application.

The interface in the chip may be an input/output interface, a pin, a circuit, or the like.

The chip system in the foregoing aspect may be a system on chip (SoC), or may be a baseband chip, or the like. The baseband chip may include a processor, a channel encoder, a digital signal processor, a modem, an interface module, and the like.

In an embodiment, the chip or the chip system described above in this application further includes at least one memory, and the at least one memory stores instructions. The memory may be an internal storage unit of the chip, for example, a register or a cache, or may be a storage unit of the chip (for example, a read-only memory or a random access memory).

An embodiment of this application provides a system, including the data processing apparatus and the network device in the embodiments of this application. All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

A person of ordinary skill in the art may be aware that, in combination with the examples described in the embodiments disclosed in this specification, units and algorithm operations may be implemented by electronic hardware, computer software, or a combination thereof To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of data processing, comprising:
receiving, by a processor, a first reference signal before a time period in which there is no reference clock and a second reference signal after the time period;
collecting, by the processor, an $i^{th}$ data packet in the time period; and
adjusting, for providing a working status of the processor, a data timestamp $T_i$ of collecting the $i^{th}$ data packet based on error information calculated from the first reference signal and the second reference signal, wherein the error information is a clock frequency error or a time error, the clock frequency error is a difference between a system clock frequency and a reference clock frequency, and the time error is a difference between a system time and a reference time;
wherein i is a positive integer, and $T_i$ corresponds to a collection moment of the $i^{th}$ data packet.

2. The method according to claim 1, wherein the error information is a clock frequency error $\Box f$, and $\Box f = f_{sys} - f_r$ is a fixed value, wherein $f_{sys}$ is a system clock frequency corresponding to a moment at which the reference clock is detected again, and $f_r$ is a reference clock frequency.

3. The method according to claim 2, wherein an adjusted data timestamp of the $i^{th}$ data packet is $T_i'$, and $T_i'$ satisfies the following:

$T_i' = T_i - (\Box f / f_{sys}) \times T_s \times i$, wherein $T_s$ is a sampling cycle.

4. The method according to claim 1, wherein the error information is a time error T or a time error t, the time error T is a difference between a reference time corresponding to a first moment and a system time corresponding to the first moment, and t satisfies the following:

$t = T/K$, wherein the first moment is a moment at which the reference clock is detected again after the $i^{th}$ data packet is collected, and K is a quantity of data packets collected in the time period in which there is no reference clock.

5. The method according to claim 4, wherein an adjusted data timestamp of the $i^{th}$ data packet is $T_i'$, and $T_i'$ satisfies the following:

$T_i' = T_i - T/K \times i$, or $T_i' = T_i - t \times i$.

6. The method according to claim 1, wherein the error information is a clock frequency error $\Box f_j$, and when a $j^{th}$ data packet is collected, the clock frequency error $\Box f_j$ satisfies the following:

$\Box f_j = T_s \times S \times j$, wherein $T_s$ is a sampling cycle, S is an increase rate of the clock frequency error, S is a real number, and j satisfies $0 \leq j \leq i$.

7. The method according to claim 6, wherein an adjusted data timestamp of the $i^{th}$ data packet is $T_i'$, and $T_i'$ satisfies the following:

$T_i' \in [T_{min}, T_{max}]$, wherein when $S \geq 0$, $T_{min} = T_i - \sum_{j=0}^{i}\left((\Box f_j / f_{sys,j}) \times T_s\right)$ and $T_{max} = T_i - \sum_{j=0}^{i-1}\left((\Box f_j / f_{sys,j}) \times T_s\right)$; or when $S \leq 0$, $T_{min} = T_i - \sum_{j=0}^{i-1}\left((\Box f_j / f_{sys,j}) \times T_s\right)$ and $T_{max} = T_i - \sum_{j=0}^{i}\left((\Box f_j / f_{sys,j}) \times T_s\right)$;

wherein $f_{sys,j}$ is a system clock frequency corresponding to a moment at which the $j^{th}$ data packet is collected.

8. The method according to claim 1, wherein
the error information is a clock frequency error $\Box f_j$ of the data packet; and
$\Box f_j$ is determined based on a correspondence between a locally stored clock frequency error of the data packet collected by the system in the time period in which there is no reference clock and a sampling condition.

9. The method according to claim 8, wherein an adjusted data timestamp of the $i^{th}$ data packet is $T_i'$, and $T_i'$ satisfies the following:

$T_i' = T_i - \sum_{j=0}^{i}\left((\Box f_j / f_{sys,j}) \times T_s\right)$, wherein $T_s$ is a sampling cycle, $f_{sys,j}$ is a system clock frequency corresponding to a moment at which a $j^{th}$ data packet is collected, and j satisfies $0 \leq j \leq i$.

10. A data processing apparatus, comprising:
at least one processor; and
a memory coupled to the at least one processor and storing program codes, which when executed by the at least one processor, cause the data processing apparatus to perform operations, the operations comprising:
receiving, by the at least one processor, a first reference signal before a time period in which there is no reference clock and a second reference signal after the time period;
collecting, by the at least one processor, an $i^{th}$ data packet in the time period; and
adjusting, for providing a working status of the at least one processor, a data timestamp $T_i$ of collecting the $i^{th}$ data packet based on error information calculated from the first reference signal and the second reference signal, wherein the error information is a clock frequency error or a time error, the clock frequency error is a difference between a system clock frequency and a reference clock frequency, and the time error is a difference between a system time and a reference time;
wherein i is a positive integer, and $T_i$ corresponds to a collection moment of the $i^{th}$ data packet.

11. The data processing apparatus according to claim 10, wherein the error information is a clock frequency error $\Box f$, and $\Box f = f_{sys} - f_r$ is a fixed value, wherein $f_{sys}$ is a system clock frequency corresponding to a moment at which the reference clock is detected again, and $f_r$ is a reference clock frequency.

12. The data processing apparatus according to claim 11, wherein an adjusted data timestamp of the $i^{th}$ data packet is $T_i'$, and $T_i'$ satisfies the following:

$T_i' = T_i - (\Box f/f_{sys}) \times T_s \times i$, wherein $T_s$ is a sampling cycle.

13. The data processing apparatus according to claim 10, wherein the error information is a time error T or a time error t, the time error T is a difference between a reference time corresponding to a first moment and a system time corresponding to the first moment, and t satisfies the following:

$t = T/K$, wherein the first moment is a moment at which the reference clock is detected again after the $i^{th}$ data packet is collected, and K is a quantity of data packets collected in the time period in which there is no reference clock.

14. The data processing apparatus according to claim 13, wherein an adjusted data timestamp of the $i^{th}$ data packet is $T_i'$, and $T_i'$ satisfies the following:

$T_i' = T_i - T/K \times i$, or $T_i' = T_i - t \times i$.

15. The data processing apparatus according to claim 10, wherein the error information is a clock frequency error $\Box f_j$, and when a $j^{th}$ data packet is collected, the clock frequency error $\Box f_j$ satisfies the following:

$\Box f_j = T_s \times S \times j$, wherein $T_s$ is a sampling cycle, S is an increase rate of the clock frequency error, S is a real number, and j satisfies $0 \leq j \leq i$.

16. The data processing apparatus according to claim 15, wherein an adjusted data timestamp of the $i^{th}$ data packet is $T_i'$, and $T_i'$ satisfies the following:

$T_i' \in [T_{min}, T_{max}]$, wherein when $S \geq 0$, $T_{min} = T_i - \sum_{j=0}^{i}\left((\Box f_j / f_{sys,j}) \times T_s\right)$ and $T_{max} = T_i - \sum_{j=0}^{i-1}\left((\Box f_j / f_{sys,j}) \times T_s\right)$; or when $S \leq 0$, $T_{min} = T_i - \sum_{j=0}^{i-1}\left((\Box f_j / f_{sys,j}) \times T_s\right)$ and $T_{max} = T_i - \sum_{j=0}^{i}\left((\Box f_j / f_{sys,j}) \times T_s\right)$;

wherein $f_{sys,j}$ is a system clock frequency corresponding to a moment at which the $j^{th}$ data packet is collected.

17. The data processing apparatus according to claim 10, wherein the error information is a clock frequency error $\Box f_j$ of the data packet; and $\Box f_j$ is determined based on a correspondence between a locally stored clock frequency error of the data packet collected by the system in the time period in which there is no reference clock and a sampling condition.

18. The data processing apparatus according to claim 17, wherein an adjusted data timestamp of the $i^{th}$ data packet is $T_i'$, and $T_i'$ satisfies the following:

$T_i' = T_i - \sum_{j=0}^{i}\left((\Box f_j / f_{sys,j}) \times T_s\right)$, wherein
$T_s$ is a sampling cycle, $f_{sys,j}$ is a system clock frequency corresponding to a moment at which a $j^{th}$ data packet is collected, and j satisfies $0 \leq j \leq i$.

19. A non-transitory computer-readable storage medium, comprising a program or instructions, which when run on a computer, cause the computer to perform operations, the operations comprising:
receiving a first reference signal before a time period in which there is no reference clock and a second reference signal after the time period;
collecting an $i^{th}$ data packet in the time period; and
adjusting, for providing a working status, a data timestamp $T_i$ of collecting the $i^{th}$ data packet based on error information calculated from the first reference signal and the second reference signal, wherein the error information is a clock frequency error or a time error, the clock frequency error is a difference between a system clock frequency and a reference clock frequency, and the time error is a difference between a system time and a reference time;
wherein i is a positive integer, and $T_i$ corresponds to a collection moment of the $i^{th}$ data packet.

20. The non-transitory computer-readable storage medium of claim 19, wherein the error information is a clock frequency error $\Box f$, and $\Box f = f_{sys} - f_r$ is a fixed value, wherein $f_{sys}$ is a system clock frequency corresponding to a moment at which the reference clock is detected again, and $f_r$ is a reference clock frequency.

* * * * *